(12) United States Patent
Ruffini et al.

(10) Patent No.: US 9,112,629 B2
(45) Date of Patent: Aug. 18, 2015

(54) CONFIGURATION OF SYNCHRONISATION NETWORK HAVING SYNCHRONIZATION TRAILS FOR TIME SYNC AND FREQUENCY SYNC

(75) Inventors: Stefano Ruffini, Rome (IT); Raoul Fiorone, Genoa (IT); Sergio Lanzone, Genoa (IT); Orazio Toscano, Genoa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 519 days.

(21) Appl. No.: 13/516,363

(22) PCT Filed: Jan. 18, 2010

(86) PCT No.: PCT/EP2010/050522
§ 371 (c)(1),
(2), (4) Date: Oct. 22, 2012

(87) PCT Pub. No.: WO2011/072881
PCT Pub. Date: Jun. 23, 2011

(65) Prior Publication Data
US 2013/0039220 A1  Feb. 14, 2013

(30) Foreign Application Priority Data
Dec. 17, 2009  (EP) .................................. 09179647

(51) Int. Cl.
*H04J 3/06* (2006.01)
(52) U.S. Cl.
CPC ............. *H04J 3/0679* (2013.01); *H04J 3/0641* (2013.01)

(58) Field of Classification Search
CPC ............................. H04J 3/0679; H04J 3/0641
USPC .................. 370/255, 441, 503; 375/346, 355; 455/502; 709/248
See application file for complete search history.

(56) References Cited

U.S. PATENT DOCUMENTS

| | | | | |
|---|---|---|---|---|
| 6,356,555 | B1* | 3/2002 | Rakib et al. .................. | 370/441 |
| 6,711,411 | B1* | 3/2004 | Ruffini ......................... | 455/502 |
| 2001/0038674 | A1* | 11/2001 | Trans ........................... | 375/355 |
| 2003/0016770 | A1* | 1/2003 | Trans et al. .................. | 375/346 |

(Continued)

OTHER PUBLICATIONS

International Search Report for PCT/EP2010/050522 mailed Sep. 28, 2010.

(Continued)

*Primary Examiner* — Jung Park
*Assistant Examiner* — Chuong M Nguyen
(74) *Attorney, Agent, or Firm* — Baker Botts, LLP

(57) ABSTRACT

Configuring a node (410) of a synchronization network involves identifying (10) possible alternative time synchronization trails arranged to carry time synchronization information for time synchronization at the node, and possible alternative frequency trails, arranged to carry frequency synchronization information for frequency synchronization at the node. Using information about the sources (20), a comparison of the trails (30) is biased to increase a likelihood of choosing time synchronization and frequency trails which share the same source, over a likelihood of choosing trails with different sources. This can help avoid divergence and consequent bit errors arising from phase errors, resulting from trails having different sources. It can encompass for example changing both to a new common source, or changing one or both trails while still using the old common source.

20 Claims, 11 Drawing Sheets

(56) References Cited

U.S. PATENT DOCUMENTS

2009/0276542 A1* 11/2009 Aweya et al. ............... 709/248
2010/0118895 A1* 5/2010 Radulescu .................. 370/503
2011/0221485 A1* 9/2011 He et al. ..................... 327/144

OTHER PUBLICATIONS

S. Ruffini, "Network Synchronization-Stand-Alone Products that Support the Design of Synchronization Networks", Ericsson Review, Jan. 1, 2004, pp. 32-41.

"Timing and Synchronization Aspects in Packet Networks," ITU-T G.8261/Y.1361 (Apr. 2008).
"Timing Characteristics of a Synchronous Ethernet Equipment Slave Clock," ITU-T G38262/Y.1362 (Jul. 2010).
"Distribution of Timing Information Through Packet Networks," ITU-T G.8264/Y.1364 Amendment 2 (Feb. 2012).
"IEEE Standard for a Precision Clock Synchronization Protocol for Networked Measurement and Control Systems," IEEE Std 1588 TM, Jul. 24, 2008.
"Series Y: Global Information Infrastructure, Internet Protocol Aspects and Next-Generation Networks," ITU-T Y.2001 (Dec. 2004).

* cited by examiner

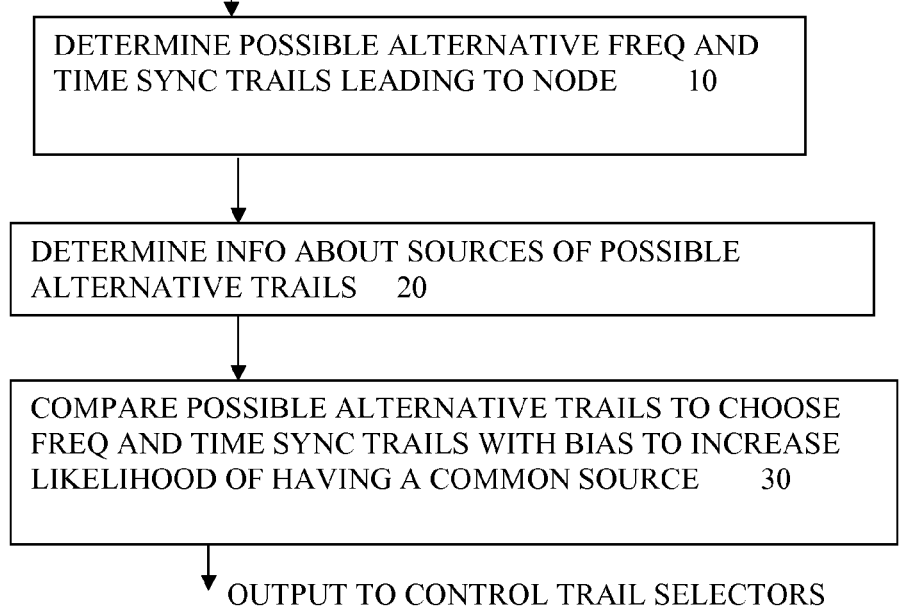
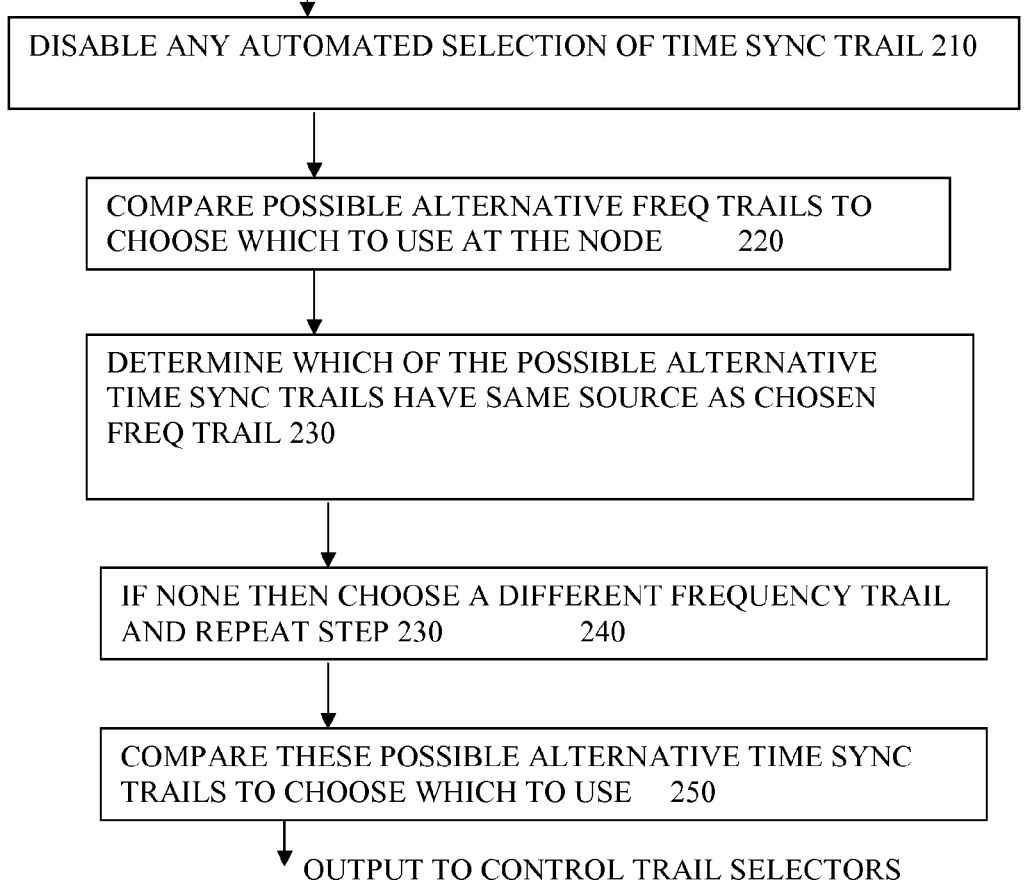

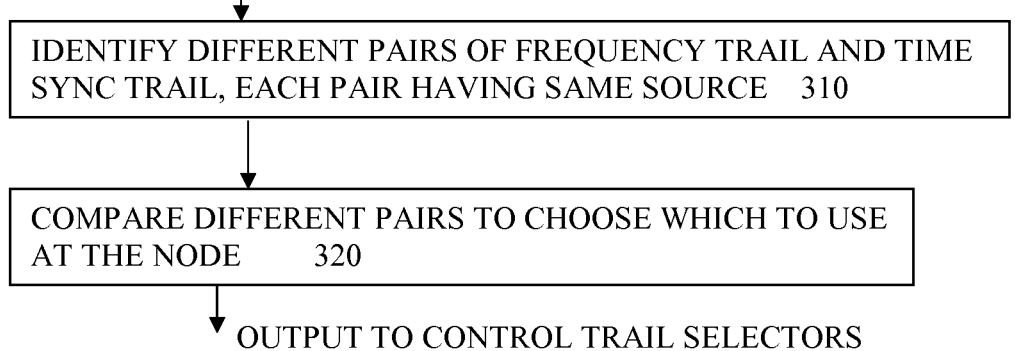
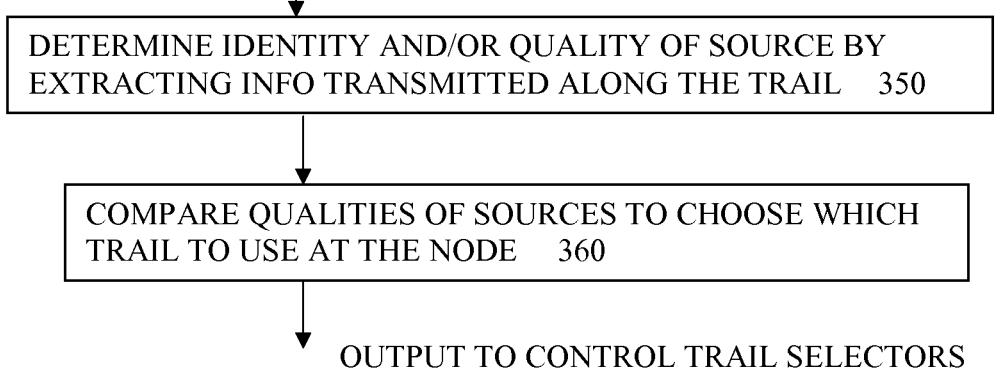

| Network Element | Synch From | Priority | Traceable to | Status (QL) | Sync Method | Sup. Status | Node Functions |
|---|---|---|---|---|---|---|---|
| A | - | - | - | "Working" | - | X = .. | Network PRC |
| B | A | 1 | A | Locked (G.811) | Phy | X = .. | = |
| B | B (Internal Clock) | 2 | B | Stand-By (G.812) | - | X = .. | = |
| C | B | 1 | A-B | Locked (G.811) | Phy | X = .. | G.8262 |
| C | B | 2 | A-B | Stand-By (G.811) | Phy | X = .. | = |
| C | C (Internal Clock) | 3 | C | Stand-By (G.8262) | - | X = .. | = |
| D | B | 1 | A-B | Locked (G.811) | Phy | X = .. | G.812 |
| D | C | 2 | A-B-C | Stand-By (G.811) | Phy | X = .. | X = .. |
| D | D (Internal Clock) | 3 | D | Stand-By (G.812) | - | X = .. | X = .. |
| E | D | 1 | A-B-C-D | Locked (G.811) | Phy | X = .. | G.8263/ PTP Master |
| E | E (Internal Clock) | 2 | E | Stand-By (G.8263) | - | X = .. | = |
| F | E | 1 | A-B-C-D-E | Locked (G.811) | Packet | X = .. | G.8263/ BC |
| F | O | 2 | O | Locked (GPS) | Packet | X = .. | = |
| F | F (Internal Clock) | 3 | F | Stand-By (G.8263) | - | X = .. | = |
| G | - | - | - | - | - | - | Forwarding |
| H | - | - | - | - | - | - | G.8263/ TC |
| N | E | 1 | A-B-D-E-F-(G)-H-(M) | Locked (G.811) | Packet | X = | G.8263/ PTP Slave |
| N | O | 2 | O-F-(G)-H-(M) | Locked (GPS) | Packet | X = | = |
| N | N (Internal Clock) | 3 | G | Stand-By (G.8263) | - | X = .. | = |
| O | - | - | GPS | Locked | - | X = .. | G.8263/PTP Master (GPS) |

CONFIGURATION OF SYNCHRONISATION NETWORK HAVING SYNCHRONIZATION TRAILS FOR TIME SYNC AND FREQUENCY SYNC

This application is the U.S. national phase of International Application No. PCT/EP2010/050522 filed 18 Jan. 2010 which designated the U.S. and claims priority to EP 09179647.4 filed 17 Dec. 2009, the entire contents of each of which are hereby incorporated by reference.

TECHNICAL FIELD

This invention relates to methods of configuring nodes of a synchronization network, to nodes for such networks, to management systems for such networks, to synchronization networks, and to corresponding computer programs for use in configuration of such networks.

BACKGROUND

There are many types of communications networks, for conveying information between remote points. For example wide area networks belonging to telecommunications providers, internet service providers, company intranets, cable television distribution systems and other data communication networks can use optical networks in which digital information is conveyed in the form of optical signals through optical fibers. Digital information in communication networks can be categorised as asynchronous or synchronous types. Synchronous types such as SDH (Synchronous Digital Hierarchy) require a common timing reference to operate accurately. That is, the clocks in one node of the network should operate at the same speed as the clocks in other nodes of the network.

To provide for a common timing reference, communication networks carrying digital information can include synchronization networks, whose job it is to ensure that a common timing reference is used throughout the communications network. One such synchronization network is described in European Telecommunication Standards Institute (ETSI) document European Guide (EG) 201 793 v1.1.1 (2000-10), entitled "Transmission and Multiplexing (TM); Synchronization Network Engineering". This document describes the various elements that make up a synchronization network, and the principles of operation by which such a network distributes accurate timing information from so-called Primary Reference Clocks (PRCs) to the clocks located in other pieces of equipment throughout the network. PRCs are the highest quality clocks in a network, and are usually based on a free-running Caesium Beam oscillator giving a very accurate clock performance.

Poor network synchronization usually leads to large amounts of jitter and wander, and, consequently, to transmission errors and buffer under/overflow. Both these faults will result in service problems causing high error rates and service unavailability. In the best case, then, poor synchronization causes only few inconveniences to any other network layer; in the worst case, it can make the entire telecommunication network stop passing traffic. A well-planned and maintained synchronization network is then a prerequisite for avoiding or reducing a risk of critical failures in traffic networks.

The planning of a synchronization network is typically performed manually, according to some rules as defined in relevant ITU-T recommendations (e.g., ITU-T G.803) and other relevant standards (e.g. the above mentioned ETSI EG 201 793). Some computer-aided tools may assist the synchronization network planning and maintenance by, for instance, supporting the off-line design of the reference timing signals distribution, as well as providing simulations of the synchronization network normal operation and fault scenarios.

Accurate planning of non-dedicated synchronization networks is generally a complicated task. Even if this is done perfectly in the initial planning, it requires significant effort in the re-planning of the synchronization network every time other network types/layers are changed.

Additional issues may arise when deploying new and heterogeneous technologies. For instance, synchronization networks can be hybrid networks made up of trails having some parts using synchronous communications and other parts using packet-based communications. For example, nodes supporting either TDM legacy (e.g., PDH, SDH), or synchronous Ethernet, can be mixed with those using packet based technologies to transfer the synchronization information. The synchronization network management, in this case, appears extremely challenging and may significantly increase the OPEX (operational expenditure) for an operator.

It is known from the Precision Time protocol (PTP) (IEEE standard 1588-2008 Standard for a Precision Clock Synchronization Protocol for Networked Measurement and Control Systems) to send synchronization information over packet networks, so that carrier Ethernet networks, for example, can carry telecom quality clocks to network nodes. This standard defines a structured time stamp based on the output of a master clock at a time of transmission of the timing packet, and an Ethernet or IP packet location for it.

PTP uses a two way transfer technique to enable frequency, time and phase alignment to be generated by slave nodes. It defines master nodes, boundary nodes and transparent nodes. The packets can be passed by any Ethernet nodes and be treated as regular data packets.

It is also known to produce at a node a synchronization reference based on physical layer derived frequency synchronization information with such packet based synchronization information derived from a different trail to produce a more accurate time or phase synchronization reference.

SUMMARY

An object of the invention is to provide an improved apparatus or method for configuring a synchronization network. According to a first aspect, the invention provides a method of configuring a node of a synchronization network, comprising identifying a plurality of possible alternative synchronization trails for passing synchronization information from a synchronization source to the node, the possible alternative synchronization trails comprising a plurality of time synchronization trails arranged to carry time (or phase) synchronization information for time (phase) synchronization at the node, and a plurality of frequency trails, arranged to carry frequency synchronization information for frequency synchronization at the node, and determining information about the sources of the possible alternative trails. The possible alternative trails are compared automatically, using the information about the sources, to choose one of the time synchronization trails for the node to use for time synchronization and to choose one of the frequency trails for the node to use for frequency synchronization, the comparison being biased to increase a likelihood of choosing time synchronization and frequency trails which share the same source, over a likelihood of choosing trails with different sources.

This can help avoid divergence and consequent bit errors arising from phase errors, resulting from trails having different sources. It can encompass for example changing both to a new common source, or changing one or both trails while still using the old common source. It can encompass biasing by making one selection algorithm dependent on the other, if there are two existing selection algorithms. It can encompass adapting either algorithm to determine the source used by the other trail.

This is based on a recognition that there can be a problem if there is no control of sources used, so even if they start with a common source, if there is any reconfiguration of trail selection of either trails at a node, then there is a good chance of a different source being selected for one or both of frequency and time synchronization and thus losing the benefit of the common source.

Any additional features can be added to those discussed above, and some are described in more detail below.

Another aspect of the invention can involve a node for a synchronization network, the node having a configuration manager arranged to identify a plurality of possible alternative synchronization trails for passing synchronization information from a synchronization source to the node, the possible alternative synchronization trails comprising a plurality of time synchronization trails arranged to carry time synchronization information for time synchronization at the node, and a plurality of frequency trails, arranged to carry frequency synchronization information for frequency synchronization at the node, the configuration manager also being arranged to determine information about the sources of the possible alternative trails. The node also has a comparator arranged to compare automatically the possible alternative trails, using the information about the sources, to choose one of the time synchronization trails for the node to use for time synchronization and to choose one of the frequency trails for the node to use for frequency synchronization, the comparison being biased to increase a likelihood of choosing time synchronization and frequency trails which share the same source, over a likelihood of choosing trails with different sources. A trail selector is also provided, controlled by the comparator for switching the time synchronization information and the frequency from the chosen trails to provide a synchronization reference for the node.

Any additional features can be added. Another aspect provides a management system for a synchronization network, the management system being arranged to carry out the method of configuring as set out above. Such centralised configuring can avoid delays in propagating changes across a large network, and make it easier for an operator to monitor or intervene)

Another aspect provides a synchronization network having a number of nodes, and having a number of synchronization trails for passing synchronization information from a synchronization source to the nodes of the hybrid synchronization network, the hybrid synchronization network having a management system arranged to carry out the method of configuring as set out above.

Another aspect provides a computer program stored on a computer readable medium and comprising instructions executable by a processor to cause the processor to carry out the method of configuring as set out above.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIGS. 4 to 9 show steps in configuring a synchronization network according to embodiments, FIG. 10 shows a database table of source and transmission characteristics for trails, according to an embodiment.

DETAILED DESCRIPTION

Figure 1:
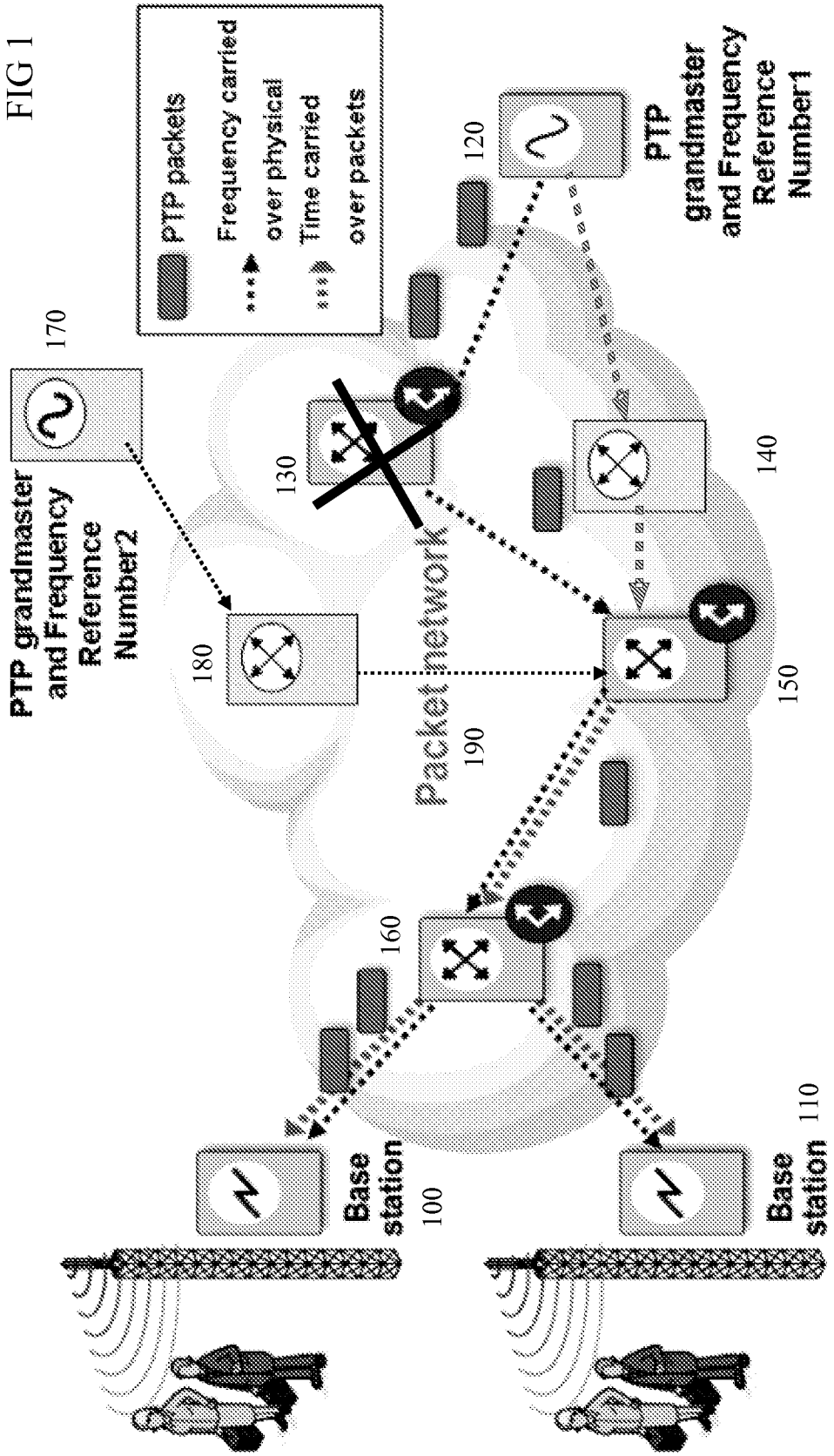
FIG. 1 shows a schematic view of a synchronization network, showing a fault in a frequency trail.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

DEFINITIONS

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to switching nodes can encompass any kind of switching node, not limited to the types described, References to software can encompass any type of programs in any language executable directly or indirectly on processing hardware.

References to hardware, processing hardware or circuitry can encompass any kind of logic or analog circuitry, integrated to any degree, and not limited to general purpose processors, digital signal processors, ASICs, FPGAs, discrete components or logic and so on.

References to trails can encompass any indication or description of a path followed by synchronization information, such as a list of nodes, or a list of links between nodes, or list of locations or directions to be followed, or an algorithm for calculating such lists or directions, or any other similar indication or description.

References to synchronization information can encompass for example distinct packets dedicated to carrying such information, or synchronization information inherent in signals for other purposes, such as synchronous data transmissions from which a clock can be extracted.

References to time synchronization are intended to encompass time of day synchronization to a real-time clock, for example as defined by the ITU-T, synchronization of phase of a clock, for example as defined by the ITU-T and so on, and references to time synchronization information are to encompass corresponding information.

References time synchronization trails are intended to encompass trails for time of day synchronization information, or phase synchronization information of a clock.

References to nodes of a network can encompass any kind of identifiable location in the network having any function such as routing or switching or multiplexing or demultiplexing or for supporting various transport technologies such as OTN, SDH, or any other kind of processing of information passed across the network, not limited to any level of integration, or size or bandwidth or bit rate and so on.

References to packet-based can encompass any kind of packet having any kind of header, or framing, and can be transmitted asynchronously, or transmitted over a synchronous link. In context of sync, such packets may have timestamp in header or payload for example. Examples are NTP packets or PTP packets as defined by RFC 1305, and many other types can be envisaged.

References to hybrid synchronization networks can encompass networks in which synchronization information (frequency or phase for example) is carried in some parts by the physical layer and in other parts carried by packet-based communication, as opposed to networks which do not use packets, or networks in which all information is carried by packets, even if the packets are carried over a synchronous physical layer. References to sources can encompass any source of timing in a synchronization trail and can encompass PRCs for frequency, and primary reference time clocks PRTCs for phase information for example. These can be implemented by GPS (global positioning system), or atomic clocks for example.

These definitions can be extended where appropriate to encompass definitions of similar parts in standards such as the well known G.810.

References to synchronization transmission characteristics can encompass any kind of characteristics which have an effect on the transmission of the synchronization information, such as number of nodes passed, speed of links used, status of parts or links used, quality characteristics such as packet delay variation, nodes which regenerate the synchronization information, nodes which enhance the synchronization information, for example by making measurements at intermediate points along the route.

ABBREVIATIONS

BMC Best Master Clock
ESMC Ethernet Synchronization Messaging Channel
GPS Global Positioning System
GSM Global System for Mobile Communications
HW Hardware
IEEE Institute of Electrical & Electronics Engineers
ITU-T International Telecommunication Union-Telecommunication
LC Link Component
LMP Link Management Protocol
LSA Link-State Advertisement
LTE Long Term Evolution
MPLS Multi-Protocol Label Switching
NTP Network Time Protocol
OPS On-Path Support
OSPF Open Shortest Path First
PDV Packet Delay variation
PRC Primary Reference Clock
PTP Precise Time Protocol
QoS Quality of Service
SSM Synchronization Status Message
SyncE Synchronous Ethernet
TE Traffic Engineering
TLV Type-Length-Value
WCDMA Wideband Code Division Multiple Access As a preliminary to the description of embodiments, some issues with conventional features of synchronization networks will be explained, to facilitate understanding of features of the embodiments and how they complement or contrast features of existing networks.

Synchronization Networks and Their Configuration

A typical digital communication network can include a synchronization network. At nodes of the communication network, there can be switching equipment that is well-known in the art. In the figures, such equipment is not shown explicitly. Transport links will generally be indicated by solid lines, and synchronization trails for carrying synchronization information (the trails being made up of a sequence of reference links) will be shown by dashed lines that include an arrow at one end to indicate the source and recipient of the synchronization information such as a reference clock signal. Where a node has the possibility of receiving a reference clock from more than one source, primary reference links (i.e., those synchronization links that are preferred to be used for supplying a reference clock from one node to another) are denoted by the number "1" next to the dashed line indicating the link. Secondary reference links (i.e., those synchronization links that are used when the primary synchronization link is unavailable) are denoted by the number "2" next to the dashed line indicating the link. Where some of the reference links forming the synchronization trails are arranged to use packet based protocols, the synchronization network is known as a hybrid synchronization network. Such packet based protocols may be carried over synchronous physical layer links of the underlying transport network.

The communications network can utilize the Synchronous Digital Hierarchy (SDH), which is a standard technology for synchronous data transmission on optical media. It is the international equivalent of the Synchronous Optical Network (SONET).

In a fully synchronized network, all sources should be ultimately traceable to a PRC. In an exemplary network, this can be called PRC A. The PRC A supplies its high quality clocking signal ("clock") to a next node which can be for example Stand Alone Synchronization Equipment (SASE). A SASE is a piece of synchronization equipment that contains a Synchronization Supply Unit (SSU), which is a high quality slave clock. The SASE distributes its clock signal to a next node which can be for example a Digital Exchange (or, in alternative embodiments, could be a Telephone Exchange). A next node can be for example an SDH multiplexer (MUX).

Other nodes can be for example an SDH Digital Cross Connect unit (SDH DXC), or an SDH Add Drop Multiplexer (ADM).

Rather than using the supplied clock signal itself, the SDH ADM can operate in a "bypass" mode (commonly named "NON-SETS locked", where "SETS" stands for "Synchronous Equipment Timing Source"), whereby the synchronization clock is merely forwarded directly to a next node. This is common when, for example, the ADM and the next node are implemented in the same building. Despite its bypass function, the SDH ADM would require a synchronization clock, and this is supplied by the next node. The SDH ADM could be arranged to provide its synchronization clock to another SDH ADM, where it might be treated as a secondary link.

Timing Loops

It is very important that the synchronization network be planned in such a way so as to avoid the occurrence of timing loops, both during normal operation as well as when a malfunction prevents one or more nodes from supplying their reference clocks to their planned recipient nodes. A timing loop is created when a clock is directly or indirectly synchronized to itself. In a timing loop situation, all the clocks belonging to the loop can show a large frequency offset compared to nominal frequency and are likely to be isolated from the rest of the synchronization network. To avoid timing loops, elements in a ring should be provided with means that enable the possible generation of timing loops to be discovered. Such elements are usually connected such that they each have at least two synchronization sources, so that when one source is discovered to cause a timing loop, there is at least the possibility of avoiding it by selecting one of the alternative sources. It is important that the clock supplied by this alternative source also not ultimately be derived from itself in order to avoid a timing loop.

In SDH networks, the use of Synchronous Status Messages (SSMs) provides some help with avoiding timing loops. An SSM is a signal that is passed over a synchronization interface to indicate the Quality-Level of the clock that the interface is ultimately traceable to; that is, the grade-of-clock to which it is synchronized directly or indirectly via a chain of network element clocks (the "synchronization trail"), however long this chain of clocks is. In a fully synchronized network, all sources should ultimately be traceable to a PRC, and there is a predefined code to indicate this. Another code, "Do Not Use for Synchronization", is used to prevent timing loops and is transmitted in the opposite direction on interfaces used to synchronize an equipment's clock.

Although the SSM algorithm is a good concept in some applications like SDH or SONET rings, it is unable to guarantee that all timing loops will be prevented, because it only provides information about the quality of the traceable synchronization reference source, but not information about the actual physical source. See, for example, chapter 4.13 of ETS 300 417-6-1, "Generic requirements of transport functionality of equipment: Synchronization layer function". Another drawback of the SSM algorithm is that it is often not supported by SASE or by Network Elements other than SDH/SONET Network elements (i.e., it can only be used between SDH/SONET Network Elements). It is noted that timing loops can cause severe disturbances in the traffic network, but that the effect of these disturbances very seldom gives a readily discernable indication of where the failure in the synchronization network occurred. It is therefore important to provide effective ways for managing synchronization networks so that, when failures occur in the network, it can be determined how to rearrange the network to maintain an acceptable quality of synchronization without creating timing loops.

Configuration Management Issues

Current practice is for the management of synchronization networks to be distributed among several platforms. The reason for this is that a synchronization network very often consists of different types of equipment that can be either dedicated to synchronization (e.g., SASE), or to both synchronization and traffic (e.g., and SDH multiplexer or a digital switch). As a result, several management systems (e.g., one for the SASE network, one for the SDH equipment, one for the switching network, etc.) have to be maintained in parallel. For example a first Switching Network Management Network might manage a Digital Exchange; a SASE Management Network manages the SASE nodes; a first SDH Management Network could be provided to manage the SDH Mux, and a second Switching Network Management Network might be provided to manage the Digital Switches at further nodes. This situation is not unrealistic, since the "same" type of equipment (e.g., an SDH ADM) may be manufactured by different vendors who design their equipment using incompatible equipment management strategies. Some or all of the management systems may be arranged to maintain a local map of neighbouring nodes and of different trails providing synchronization information from various sources to each of their nodes. These management systems would have to be individually configured with details of any changes outside their area of control.

Hybrid Synchronization Network

By replacing the method of handling synchronization information at some of the nodes to use packet-based communication, the synchronization network becomes a hybrid network. A network where synchronization information is carried over packets allows the distribution of phase and time information as well as frequency information. Where some parts of the trails use packet-based communication, this can add a further complication to management of the configuration of the synchronization network, both at the initial planning or commissioning stage and ongoing configuration during the service life of the networks. This may involve continuous maintenance by maintenance personnel who may need to be physically present at the numerous sites of the different nodes. In most cases, this physical presence at each site is difficult and expensive due to geographical distribution of the synchronization network.

In the packet based method, the synchronization is carried across a packet network by sending packets containing timestamp information. The timestamps are generated by a master (server) that has access to an accurate reference, such as GPS. Packet-based methods of distributing synchronization information have the advantage of being able to provide accurate time synchronization in addition to the frequency synchronization, but suffer from the disadvantage of being dependent on the network load and congestion conditions.

On the contrary, methods based on the physical layer, have the advantage of being not dependent on the network load and congestion conditions but the disadvantage of not being able to provide any time synchronization in addition to the frequency synchronization (as required by many present applications). The physical layer method is currently re-defined in the Ethernet context with the ITU-T Synchronous Ethernet concept (see for example G.8261 Timing and synchronization aspects in packet networks, G.8262 Timing characteristics of synchronous ethernet equipment slave clock (EEC) and G.8264 Distribution of timing information through packet networks).

In other words, both classical physical level based method and packet based method have important drawbacks: the first one not being able to carry any time information and the second one being impaired during severe load or congested situations.

One possible approach to overcome the drawbacks of the two methods and take advantage of their benefits is being considered now by the telecommunications community and involves the combination of the two methods into a new hybrid synchronization network.

This solution adopts the excellent frequency distribution characteristics of the physical method and overcomes its lack of time distribution by combining it with a dedicated packet distribution. One example of the combination is the possibility to synchronize in time only during limited periods of low traffic load (e.g. at night), and let the accurate frequency carried by physical layer (such as SyncE) drive the remote time generation.

Problems in Hybrid Synchronization Networks

The attempt to overcome these issues with a hybrid solution brings another issue related to the possible case of different synchronization sources being selected for phase and frequency. The remote reference master used as source for time information will be selected by the slave node according to an independent algorithm, i.e. best master clock algorithm (as for example described in the above referenced IEEE 1588 PTP Protocol). The remote reference master used as source for frequency information will be selected by the slave node according to the well known ITU-T hierarchical method based on pre-assigned priorities and on the exchange of in-band SSM (Synchronization Status Messages).

In a case of SDH/SyncE reorganization due to failures in the synchronization network, up to some microseconds of error may result between frequency and time due to phase errors allowed in the SDH/SyncE reference switch and to the Holdover characteristics of the clock implemented in the synchronization network.

Such reorganisation and reselection of sync trails can result in the use of different masters for the frequency synchronization and time synchronization trails. This can result in errors of about 70 ns per hour (due to the $+/-10^{11}$ frequency difference). This can become critical when time synchronization is achieved by means of timing support in the transport network via for instance IEEE1588 Boundary Clocks: every Boundary Clock potentially locked to a different frequency sync master could contribute to build a total phase error which exceeds the target requirements at the end node.

This behaviour is going to create problems particularly in the applications which need to make use of time synchronization (for instance, TD-SCDMA, CDMA2000, WCDMA TDD) because of their more stringent requirements, which are in the range 1-3 μs.

Features of the Embodiments

In order to address some of the issues above and with the purpose of reducing the related OPEX, the classical solution for TDM networks based upon the physical layer in order to recover synchronization from a synchronous stream of data, is combined with a packet based method to combine the best aspects of the two, and address problems arising from the independent selection criteria which can introduce inaccuracies.

At least some of the embodiments involve aligning the trail selection methods in order to have the same master for the two methods. In some embodiments these methods are based on PTP and SyncE or other physical layer based synchronization methods.

A new protocol is therefore specified and detailed showing how SyncE (or SDH) and IEEE1588 can be effectively used in hybrid synchronization architectures. Although described using PTP as a reference packet based method but it should be noted that other packet based methods can be used. The same applies to Synchronous Ethernet as a reference physical layer method to deliver frequency. In some embodiments, the remote master selection algorithm of one of the two methods is disabled in order not to let them select different masters.

For the master selection, PTP uses the algorithm defined in the IEEE1588 (Best Master Clock algorithm as detailed in the ITU-T Telecom Profile), while Synchronous Ethernet and SDH uses the traditional ITU-T hierarchical scheme specified in the ITU-T G.803, G.81xx and G.826x suite of documents. One possible approach is to privilege the most critical path, which is normally related to frequency distribution, and therefore to consider the SyncE (or SDH) selection algorithm as a starting point to achieve an extended algorithm able to achieve the requested behaviour. (The opposite approach might also be considered.)

This can be based on methods where the ESMC channel, in addition to carrying the traditional SSM information, also carries information on the full sync trail, in particular on the active masters of every available sync reference.

One consideration that arises is to maintain the two selection algorithms self-aligned in a fast and efficient way during and after transient situations (e.g. failures).

Some Additional Features

Additional features of some embodiments can include the following:

The comparing step can comprise choosing the frequency trail first, and subsequently biasing the choosing of the time synchronization trail to increase a likelihood of choosing a time synchronization trail having the same source as that of the selected frequency trail. If frequency synchronization is more critical this can give priority to frequency trail selection, to ensure a good quality trail or enable quicker selection of the frequency trail. This may be particularly useful where there are many hundreds of ports and therefore significant delays in assessing and comparing many trails, or where long gaps without frequency synchronization cannot be tolerated.

In principle the order can be reversed if time synchronization is more critical, to give priority to time synchronization trail selection, to ensure a good quality trail or enable quicker selection of the time synchronization trail. This may be particularly useful where there are many hundreds of ports and therefore significant delays in assessing and comparing many trails, or where long gaps without time synchronization cannot be tolerated.

The comparing step can be biased by determining a plurality of different pairs of frequency trail and time synchronization trail, each pair sharing the same source, and comparing the pairs to choose which pair to use. This can be useful if neither frequency nor time synchronization is more critical than the other, and so a compromise is preferred.

At least some of the frequency trails can comprise a physical layer path taken by data transmitted synchronously, from which a clock signal can be extracted to derive the frequency synchronization information. This can provide better quality frequency synchronization which can be independent of traffic loading in the network.

The method can have at least some of the synchronization trails arranged to use packet-based communication. This can provide trails which can be rerouted and so be less susceptible to link or node failures, and can in some cases provide two way flows to enable delay measurements, which cannot be carried out easily in the physical layer.

The step of determining information about the sources can comprise receiving at the node, information transmitted along a trail relating to a source of that corresponding trail. This can be simpler for the node to process since there is less need to associate the information with its trail, the association is a physical association. This can also avoid the delays inherent in obtaining or deriving this source information from other sources such as a centrally held map of the network.

The comparing step can involve comparing a quality of the sources of the different possible alternative trails. This can provide the most useful indicator of quality of the resulting synchronization at the node.

The node can have a database for storing information relating to the trails, and the method can have the steps of receiving and storing at the node updated information about the trails from a neighbouring node, reassessing at the node the choice of frequency and time synchronization trails based on the updated information, using the newly chosen frequency and time synchronization trails for synchronization at the node, and sending out updates to neighbouring nodes to pass on the updates and to indicate the new trail selection. By applying this to ongoing reconfiguring, as well as initial set up, reductions in opex can be increased further.

At least some of the frequency trails can comprise a physical layer path taken by data transmitted synchronously, and the node can have circuitry arranged to extract a clock signal and derive the frequency synchronization information, at least some of the time synchronization trails being arranged to use packet-based communication.

Some embodiments can have distributed management of the configuration of the synchronization network in which all nodes involved in the synchronization network exchange information in order to build a picture of the synchronization network itself and its sync trails. This can be used to maintain it (e.g. select the synchronization reference according to pre-defined rules) and allow for appropriate reaction by reconfiguring when any topology change or network failure is detected.

This could be done either in a centralized or in a distributed manner: in the former case a network management central node takes care of distributing all necessary information and configuration commands. In the latter case each node maintains a database containing all the information relating to the entire network.

The initial set-up of the network could be designed by the operator. Any reconfiguration during operation could be carried out autonomously, or alternatively, the automation may be also extended to some or all of the initial set-up of the sync network.

This is similar to what is defined in the above referenced IEEE1588 Best Master Clock Algorithm in the area of packet based synchronization: a signalling channel (Announce messages) is used to communicate between all the IEEE1588 nodes and, for each node, to define its role in the network and, for the slaves, to define their master.

Figure 2:
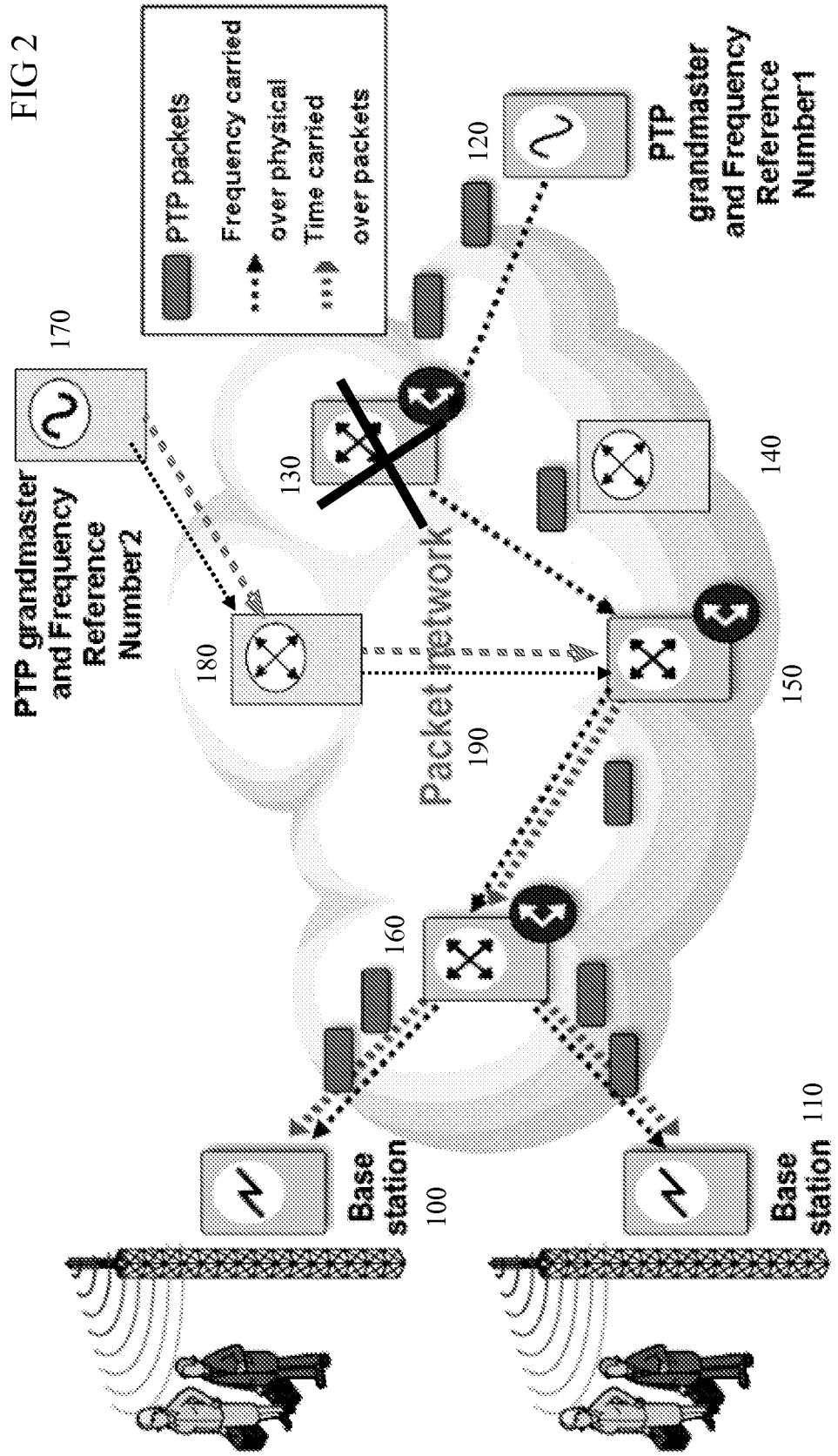
FIG. 2 shows a similar network after selecting alternative trails having a common source.

FIGS. 1 and 2 Failure on the Selected Frequency Trail and Resulting Reconfiguration FIG. 1 shows an example of part of a hybrid synchronization network. Typical networks may be much larger with many more nodes, only a few are shown, for the sake of clarity. A first node 120 has a first source of frequency synchronization information, and a back up second source is provided at node 170. The purpose of the synchronization network is to pass synchronization information over the nodes and links of a communication network in the form of a packet network 190 operating over nodes and links of a physical layer, to reach endpoints such as base stations 100 and 110. A fault is shown by the cross over node 130. As originally configured, before this fault, the frequency synchronization information was passed by a frequency trail shown by the smaller dotted line arrows passing from the source at node 120, via nodes 130, 150, and 160, to the base station nodes 100 and 110. The time synchronization information was passed in packets over a time synchronization trail having a slightly different route, as shown by the larger dotted line arrows from the same source node 120, via nodes 140, 150, and 160.

Following the fault, the end nodes will experience a failure in the synchronization extracted from the currently selected first source (e.g. Out of frequency alarm, loss of signal alarm and so on). This is detected using conventional techniques, and this prompts the end node to enter the holdover state and start a new source selection process. This causes the hybrid synchronization network to be reconfigured as shown in FIG. 1 so that the frequency trail no longer uses the faulty node 130. As there is no alternative trail from the first source 120, this involves selecting an alternative frequency trail which starts at the second source, shown as frequency reference number 2, at node 170. The time synchronization trail is so far unaltered as it does not use the faulty node 130. This amount of reconfiguration is enough to restore a working frequency trail to the base stations, but it is evident that the frequency and time synchronization trails now have different sources, giving rise to the problems mentioned above. This amount of reconfiguration as shown in FIG. 1 can be regarded as a conventional amount of reconfiguration for a hybrid network, or can be regarded as a first stage of a two stage reconfiguration according to an embodiment of the present invention.

FIG. 2 shows a similar view of the same network, showing the outcome of a second stage of the reconfiguration according to an embodiment. This figure shows that a different time synchronization trail has been chosen, to start from the second source at node 170, and pass through nodes 180, 150, and 160, so that the frequency and time synchronization trails again have a common source.

Figure 3:
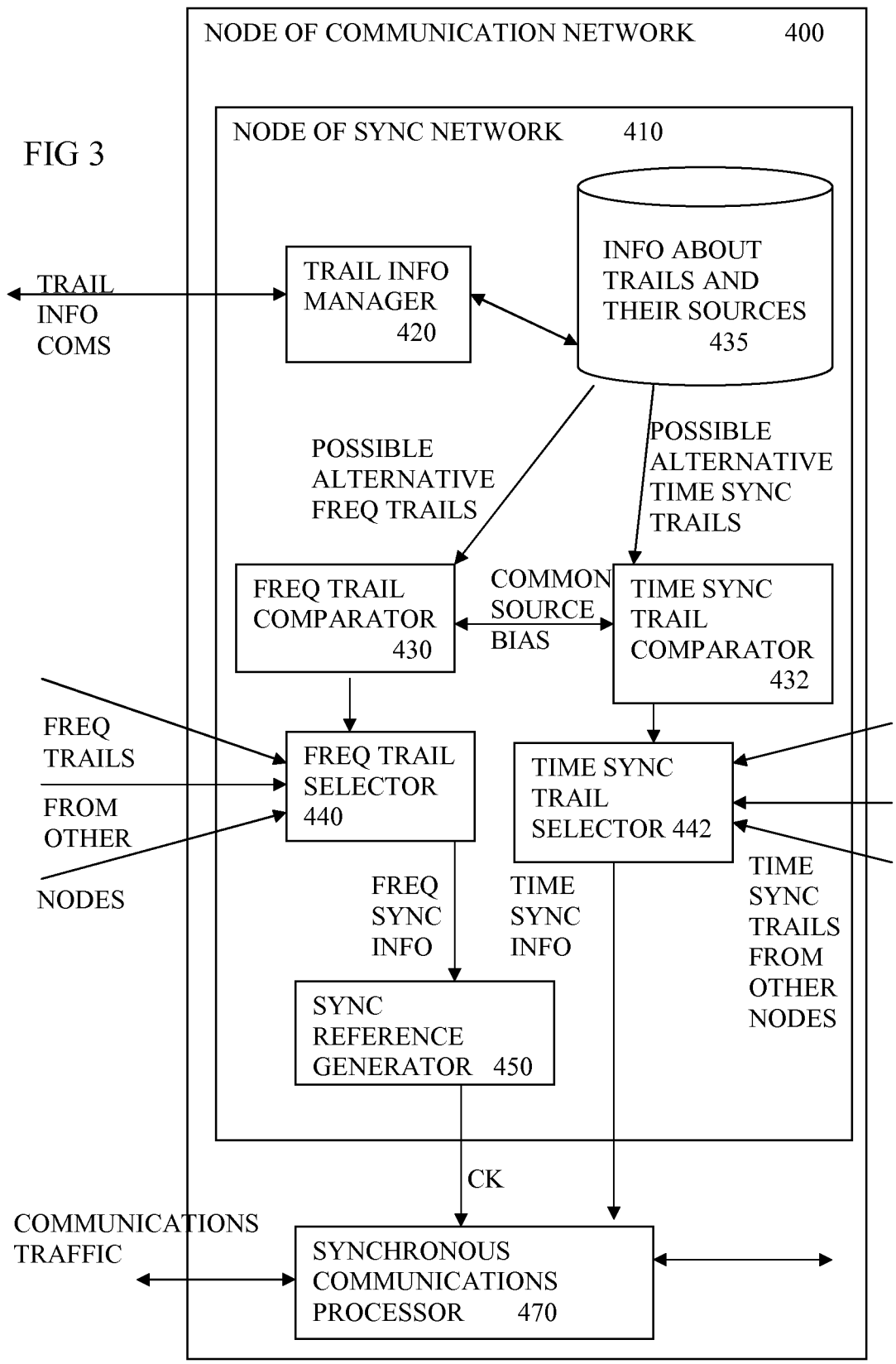
FIG. 3 shows a schematic view of a node of a synchronization network according to an embodiment.

FIG. 3, Node According to an Embodiment

FIG. 3 shows a schematic view of an example of a node. This shows a node 400 of the communications network. This contains a node 410 of the synchronization network, and other features not used by the synchronisation network, such as the synchronous communications processor 470. This is for processing the synchronous traffic on the transport links of the communications network following conventional practice. It is synchronised by the synchronization reference or clock, CK output by the node 410 of the synchronization network.

This node of the synchronization network has a frequency trail selector 440 for selecting which one of the various frequency trails leading to this node, is selected for providing the frequency synchronization information. This synchronization information is used by the synchronization reference generator 450 in the usual way, to generate the clock. The frequency trail selector is controlled by an output of the frequency trail comparator 430. This output effectively governs the configuration of this part of the synchronization network, by controlling which of the trails is selected.

The frequency trail comparator can use information about the source and about the trails as stored in a database 435. A trail information manager 420 fills and maintains this database, by exchanging information with neighbouring nodes, about trails that they are aware of, as indicated by the "trail information coms." in the figure.

Also shown is a time synchronization trail selector 442 for providing time synchronization information to the synchronous communications processor 470. This time synchronization information such as time of day or clock phase, is used by the synchronization communications processor 470 in the usual way, to refine its clocks or centre properly its buffers to minimise any loss of data from small phase differences for example. The time synchronization trail selector is controlled by an output of a time synchronization trail comparator 432. This output effectively governs the configuration of the timing part of the synchronization network, by controlling which of the time synchronization trails is selected.

In practice, this trail information about the sources and synchronization transmission characteristics of the trail can be carried over the same physical paths as used by the communications network, or used by the synchronization trails themselves, or can use independent paths. Similarly, the synchronization trails can use the same physical paths as the communication network traffic, or have independent paths. The trail information manager and the trail comparator can be implemented as software modules run by a general purpose processor for example, or can be implemented by software executed by separate hardware, as desired. The node may have a portion of a control plane 425 following conventional practice, spread across all nodes of the communication network, for distributed control of the traffic in the communications network. This same control plane can be adapted and used to implement the functions of the trail info manager and the trail comparator.

In the embodiments having management of configuration distributed across the nodes, the equipment at each node has an interface that is capable of supporting IP, and all such equipment is connected to an IP network. It is emphasized, however, that the use of IP standards is not essential, and that other telecommunication protocol standards could be substituted, so long as those other protocols permit the communication of information between nodes as described below.

In some embodiments, each node further has a storage device that stores a table that defines the relationship between each node and other physical links in the Synchronization Network.

FIG. 4, Operational Steps in Configuring Synchronization Trails

First an overview of the operational steps will be described in general terms. The tables in each node are initialized to reflect the initial state of the synchronization network. This can be done by any node to node communications protocol as discussed above. Each node (including the Integrated Synchronization Network Management node, if one is included in the embodiment) now has a complete picture of trails indicating how reference clocks are propagated throughout the network. Next, the synchronization network is operated, using well-known techniques, to distribute synchronization reference clocks to each node along the trails. So long as there are no problems or other changes, this continues indefinitely.

However, whenever a change in status occurs at a node, the table in the affected node is updated. The node to node protocol is then used to propagate this information to all other nodes in the synchronization network, including the Integrated Synchronization Network Management node, if one is included in the embodiment. As updated information is propagated throughout the synchronization network, one or more nodes may respond with their own changes in status/configuration, therefore requiring further updates to the tables. Thus, through well-known iterative techniques, and the node to node protocol, the further updated information can be propagated to all other nodes in the synchronization network, including the Integrated Synchronization Network Management node, if one is included in the embodiment.

Eventually, no further changes are made at any nodes, and each node again has a complete picture of how reference clocks are propagated throughout the network. The synchronization network can then again be operated, using well-known techniques, to distribute synchronization reference clocks to each node. The above described techniques make it possible to completely carry out all of the synchronization network management functions in a unified manner yet distributed across the nodes, or under control of into a single (centralized) node. This is especially important now that new types of equipment (IP routers in particular) are starting to need to be controlled by a Synchronization Network Management Network as well.

FIG. 4 shows some of the steps in a method of configuring a node, either by a centralised management system, or in a distributed way at each node. Such configuring can encompass reconfiguration of a node after a fault or any change. At step 10, it is determined which possible alternative frequency trails and time synchronization trails lead to the node. At step 20, information about a source of each trail is determined. The determining of the source information can involve transfer of information between nodes or can involve looking up such information previously stored in the database. The trail information can be periodically updated, perhaps as a result of a fault or alarm condition, or reconfiguration of any part of the communications network. This can be by exchange of information between nodes, as described in more detail below, or via a centralized management system.

Different trails are compared at step 30, to select which trails to use for providing the synchronization reference for the node. This comparison is biased to increase the likelihood of choosing frequency and time synchronization trails having a common source. These steps can be implemented in hardware or software executed by a general purpose processor, as desired, and can be carried out centrally or locally at the node. More details of examples of how some of these steps can be implemented, will be described below.

FIG. 5, 6 Steps in Comparing Trails

FIG. 5 shows a flow chart of steps involved in one way of implementing the comparing step so as to bias it. Once it is determined that configuration is needed, step 210 involves disabling any automated selection of a new time synchronization trail. At step 220 possible alternative frequency trails are compared against predetermined criteria to choose which to use at the node. Some ways of implementing this step are described in more detail below. Optionally the new selection is recorded, optionally in a table as shown in FIG. 10, described below, and if second and third priority levels and so on are determined for the remaining frequency trails, these priorities can also be recorded. This can enable the node to switch to a back up trail instantly if needed, without a full reassessment of the priorities.

Step 230 shows starting the selection of the time synchronization trail, by determining which of the possible alternative time synchronization trails have the same source as the chosen frequency trail. If none are found then at step 240, a different frequency trail is selected and step 230 is repeated. By limiting the choice of time synchronization trail to those with the same source as the already chosen frequency trail, this is one way of biasing the comparing of trails to increase the likelihood of a common source.

FIG. 6 shows an alternative to FIG. 5 and shows a flow chart of steps involved in one way of implementing the comparing step so as to bias it. Once it is determined that configuration is needed, step 310 involves identifying a number of different pairs of frequency trail and time synchronization trail, each pair having a common source. At step 320, there different pairs are compared against predetermined criteria, to choose which is best. By limiting the choice to pairs having the same source, this is another way of biasing the comparing of trails to increase the likelihood of a common source.

FIG. 7, Criteria for Comparing Trails

The embodiments of FIGS. 5 and 6 can involve comparing the qualities of sources as part of the criteria for choosing an optimum trail or pair of trails. Other criteria can include lengths of the trails, or reliability or congestion statistics, or data rate for example. Another factor can be whether there are any nodes which regenerate the synchronization information, such as boundary clock nodes. Again this can be based on the node function information in the eighth column of the database as shown in FIG. 10 described below. At step 350, the identity and/or quality of source by extracting information transmitted along the trail. This can apply to both the physical layer based trails, and the packet based trails. The quality of the source can be in terms such as jitter, wander or reliability for example.

Figure 8:
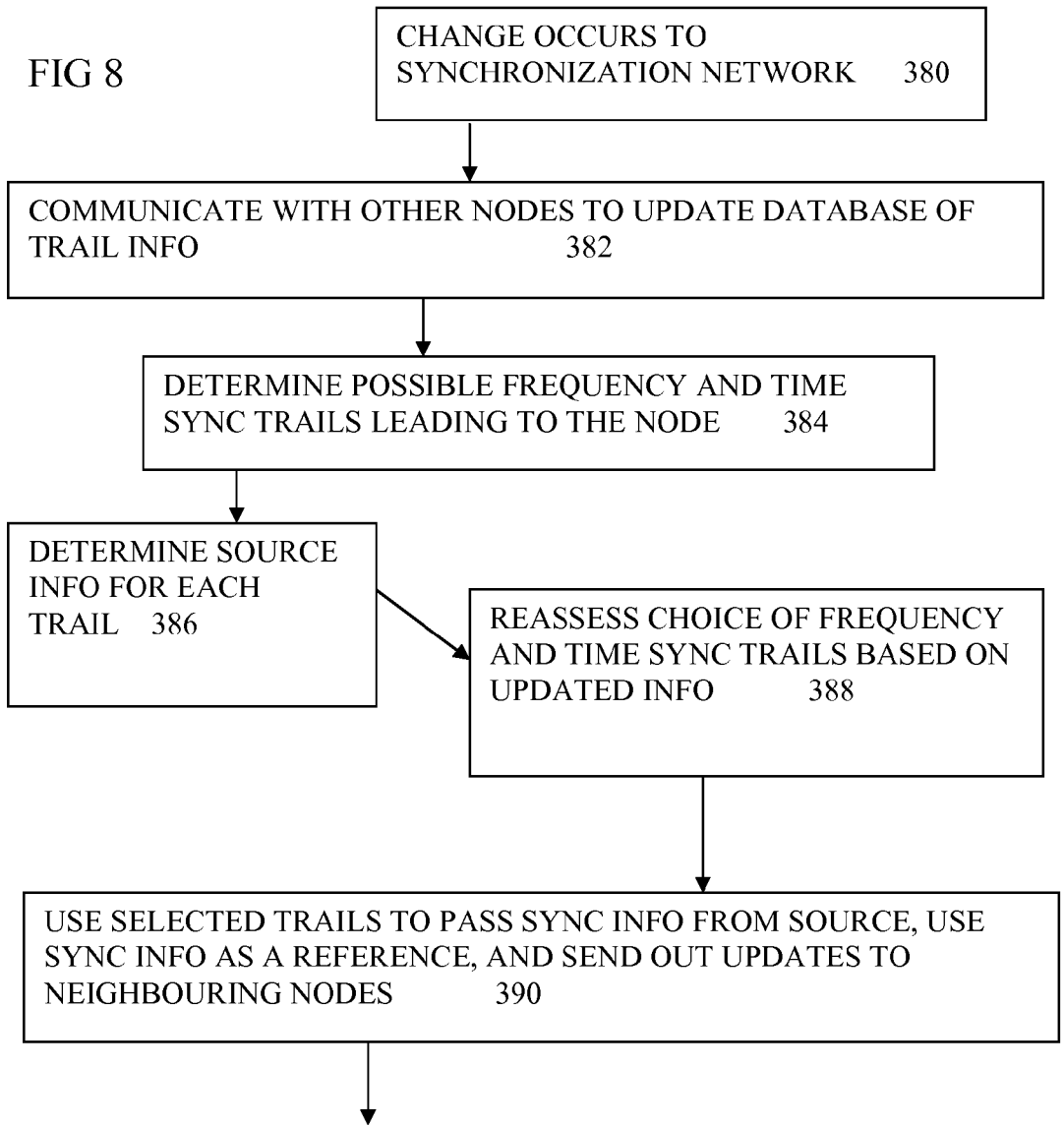

FIG. 8, Reconfiguration Example

FIG. 8 shows some steps involved in reconfiguring the network during use. At step 380 a change occurs to the synchronization network, such as addition of a new node, or a fault. At step 382 the nodes communicate with each other to update their database of trail information. At step 384, a node affected by the updates determines possible alternative frequency and time synchronization trails leading to the node. At step 386, source information for each trail is determined. This can be the source identity, to facilitate ensuring common source, or can encompass determining quality characteristics of the source as discussed above.

At step 388 the choice of frequency and time synchronization trails is reassessed based on the updated trail information. This can involve repeating steps shown in FIGS. 5 to 7 for example. At step 390, the selected time synchronization and frequency trails are used to provide the synchronization reference for the node. Updates to neighbouring nodes can be sent out to enable them to update their local copy of a map of the trails of the synchronization network and their status.

Figure 9:
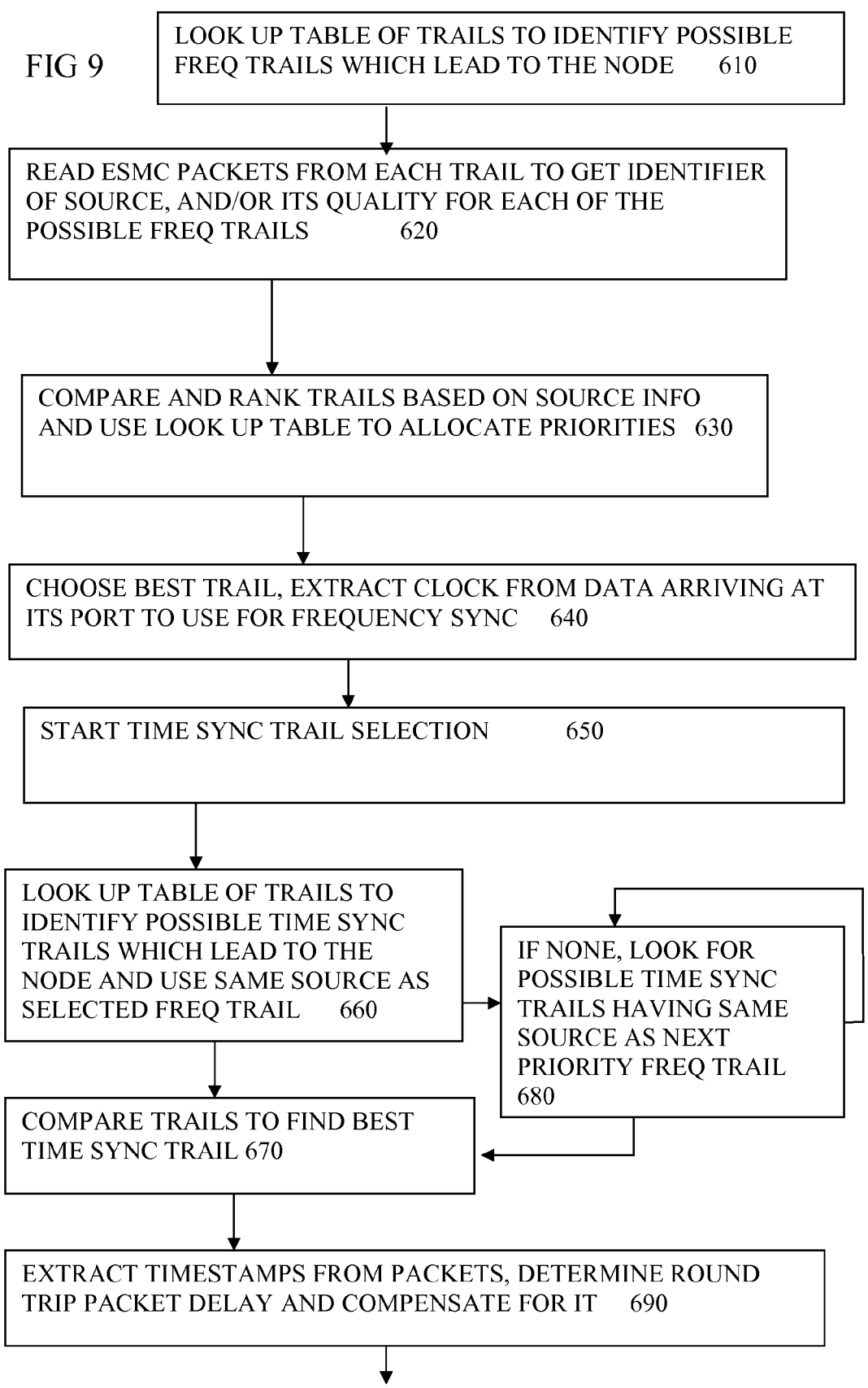

FIG. 9, Two Stage Example of Configuration

The example of FIG. 9 has steps corresponding to those of FIG. 5, and shows more details. At first, the frequency trial is chosen, and the selection of time synchronization trail is inhibited. In step 610, the node looks up its table of trails to identify possible frequency trails which lead to the node. At step 620, ESMC packets are read from the physical layer underlying each of the frequency trails, to determine an identifier of the source, and/or its quality, for each of the frequency trails. At step 630, the possible frequency trails are compared and ranked based on this source information, and using trail information looked up in the database.

At step 640, the optimum of the frequency trails is chosen, and the trail is used by extracting a clock from data arriving at the port corresponding to the trail. The extracted clock can be used as the basis for a frequency reference, for example by using a phase locked loop to lock a local clock to the derived clock or by comparing a local clock in any other way.

At step 650, the inhibition on selection of a time synchronization trail is lifted and at step 660 the node looks up its table of trails to identify possible time synchronization trails which lead to the node and which have the same source s the selected frequency trail. If none are found, at step 680, the node looks for any time synchronization trails having the same source as a next ranked frequency trail and so on, until time synchronization trails are found. Then the best of these selected time synchronization trails is found by comparing against given criteria as discussed above. The frequency trail is changed if needed and at step 690, the time synchronization trail is brought into use by extracting timestamps from the packet stream. Optionally the timing information can be compensated for transmission delay by determining a round trip packet delay and using that to estimate the outgoing delay from the source.

Trail Comparison and Selection Using OSPF principles

With this trail information, the node (any network element) can define alternative synchronization sources without the risk of creating timing loops and in accordance to the network synchronization plan. Alternatively, as already mentioned, the process could use some more advanced mechanisms where the network element chooses the most convenient synchronization reference based on some appropriate algorithm (for instance minimizing the length of the trails). An output indicating which trail to select is sent to control a trail selector at the node. In this context, although not illustrated, the selector can of course include an internal trail from an internal sync generator which of course need not pass through any other nodes, or over any links between nodes, in which case the trail can be represented simply by an indication that the trail is internal. An example of a process for such selection of trail can use the principles used in the OSPF (Open Shortest Path First) protocol, as shown for example in U.S. Pat. No. 6,711,411 B1 "Management of Synchronization Network"—Stefano Ruffini, Mar. 23, 2004. The OSPF can provide a fast reaction in case of changes in network topology and flexibility in rearranging the network based on proper optimization algorithm. Via an extension of the OSPF protocol all nodes in the synchronization network have information on the synchronization links status of the overall synchronization network.

The basic principles are applicable to the network synchronization application. It is assumed that each node must have assigned a unique address.

The automated determination of information about the trails of the sync network from other nodes can use principles that are known in connection with link state routing protocols such as the Open Shortest Path First (OSPF) data routing protocol. These principles can be advantageously applied in the present invention relating to synchronization network management because they provide for fast reaction in case of changes in network topology, small overhead traffic, and flexibility in rearranging the network based on proper optimization algorithms.

This is not to be understood to mean that the conventional link state routing protocols are necessarily useful for managing synchronization networks-they are not if, for example, they do not provide for the exchange of data pertinent to the synchronization network management functions (e.g., data pertaining to synchronization trails and status). However, the OSPF routing protocol enables all routers in an IP network to have a complete picture of the IP network for purposes of being able to route each data packet from its source node to its intended destination node, and it will now be described how these concepts are usefully applied to facilitate the management of synchronization networks.

In OSPF, providing all routers with a complete picture of the IP network is accomplished by having each router send updates of its link state (i.e., information about changes in the status of connected links) to other neighbouring routers in the IP network. In a recursive way, the same information is spread throughout the network, until each router has the information, and can create a complete picture of the IP network that can be used in the routing of IP packets.

Messages Used for Inter Node Exchange of Trail Info

In accordance with at least some embodiments of the invention, a similar approach can be used to provide each node in the Synchronization Network with complete information about the link status of all of the other nodes in the Synchronization Network. To do this, the information needed is the active synchronization reference and its status (that is, the identity of the traceable synchronization source and its quality; and the identities of the stand-by (back-up) synchronization references and their status.

A number of messages are required in order to distribute the information between the nodes. Similarly to what is specified in OSPF the following types of messages are needed:
- (Sync) Hello—to periodically inform the connected nodes of the sender's synchronization status;
- (Sync) Database Description—to inform about the active and stand-by synchronization references and their quality status in the initialization phase;
- (Sync) Link State Request—to update the synchronization data, e.g., after the database description has been received by a node and its own database is found to be out of date;
- (Sync) Link State Update—to inform other nodes of changes in the synchronization status;
- (Sync) Link State Acknowledgement—to acknowledge the receipt of a Link State Update.

Note: all these messages are sent to the adjacent nodes. All nodes in the network, however, recursively receive the information.

If messages are received from nodes that are not neighbours (according to the topology information owned by the receiving node), these are discarded. The list of neighbouring nodes is formed via the (Sync) Hello messages. At network set up this may also be defined by the network management node in order to speed up the set up process. Additional messages are needed for the provisioning and set up of the network, e.g.:
- A command to set up which reference should be accepted as a candidate synchronization reference;
- A command to set the priorities for the different references;
- One or more commands to set up thresholds for supervisions parameters, if any.

The sequence of steps in managing such a network could be summarized as follows:
- The nodes are configured from a centralized system with some basic information (e.g. priorities for masters and in general the information on sync network topology as defined by the operator);
- Tables in each node are updated using the (Sync) Hello and (Sync) Database Description messaging). This corresponds to step 20 of FIG. 3, mentioned above. Each node (or in some cases only a centralized node) has a complete picture of the synchronization network;
- The network is operated accordingly;
- When a change occurs at node X, table of this node is updated (again corresponding to step 20), the selection of the trail for that node may be reassessed (corresponding to step 30 of FIG. 3), and the new information is propagated to all other nodes in the network (including the centralized node) via the (Sync) Link State Update messaging;
- As information is propagated throughout the network, one or more nodes may respond with their own changes, thus further requiring changes in table of node X. The iterative process will eventually result in a new status of the synchronization network.

Further examples having some similar steps are shown in other figures described below. In the case of a fully automated network, the initial configuration can include only basic data (such as the name and location of the master(s)) and other constraints defined by the operator. The trail selection (also called synchronization reference selection) performed by each node can be carried out according to some iterative process (similar to the case of recovery after failures in the network) and based on some appropriate rules and algorithms.

FIG. 10, Packet Format and State Tables

An example of database information owned at a certain point in time by each node is shown in FIG. 10. This full table can be forwarded in the (Sync) Database Description messages to the adjacent nodes. The (Sync) Link State Update would usually only include the portion of the table that is requested in the (Sync) Link State Request (e.g. the rows that concern a specific node). The (Sync) Hello packets can include information on the sender status only (e.g. status of the connected sync links).

The table has a number of rows for each of the nodes of an example network, the nodes being labelled A, B, C, D, F, G, H, N and O respectively. In this example, each row corresponding to a different trail leading to each node, or to an internal trail for that node. In a first column 301 of the table, each of the nodes in the Synchronization Network 200 is defined. For each of these nodes, an entry in a second column 303 of the table identifies the node's source of synchronization. For example, node A is a PRC, and thus has no other source. Node B has a link to receive synchronization from node A, and this is indicated in the second column 303. Moreover, for node B this is the preferred source of synchronization, so in a third column 305 of the table, there is an indication that this source is to be given highest priority (e.g., priority "1").

Many nodes have more than one possible source of synchronization. For example, node B has a link to receive synchronization from node A, as indicated above, but also has an internal clock that it can alternatively use as a synchronization reference. Each of these is assigned a relative priority that indicates an order of preference of use of these possible synchronization sources. So, for example, node B's highest priority synchronization reference is received from node A, and its next highest priority synchronization reference (in this case, priority "2") comes from node B's own internal clock.

A fourth column 307 in the table indicates the succession of nodes through which the synchronization reference can be traced. For example, node A is a PRC, so there are no nodes through which its synchronization reference is derived. For node B, the synchronization reference is traceable to node A when the highest priority reference (i.e., the one provided by node A) is used, and alternatively traceable to B itself when B's own internal clock is used. The parenthesis is used in the fourth column to indicate when a Node is part of the sync over packet chain but is only forwarding the timing packets, not processing them or enhancing them.

A fifth column 309 indicates for the network element, the status of the corresponding synchronization reference. Possible states include: "Network PRC (G.811)"; "locked (G.811)"; "stand-by (G.812)"; and "stand-by (G.813)", the latter being a lower quality clock than that defined by G.812. These states are well-known in the art, and are defined, for example, in ITU-T recommendation G.811 (February 1997), "Timing characteristics of Primary Reference Clocks"; and ITU-T recommendation G.812 (February 1997), "Timing characteristics of Slave Clocks"; and ITU-T recommendation G.813 (August 1996), "Timing characteristics of SDH Equipment Slave-Clocks (SEC)", all of which are hereby incorporated herein by reference in their entireties.

A sixth column 311 indicates whether the trail has a packet-based part, or whether it is carried by synchronous links. A seventh column 313 in the table indicates a Supervision Result, such as: Maximum Time Interval Error (MTIE), Time Deviation (TDEV), Frequency Deviation (FDEV), and the like. In case of a packet based link, this could be a PDV measurement. PDV measurements are under consideration as part of standard G.8261. These Supervision Results are the result of usually periodical supervision, and are set by the routine in the network element performing the supervision tests. These results may be read by the operator to check the quality of a synchronization network, but may also be used by the synchronization network in an automatic manner in order to reconfigure the synchronization network (e.g., in case a link exhibits poor quality). The Supervision Results MTIE and TDEV are well known in the art, and are defined in ITU-T recommendation G.810 (May 1996), "Definitions and terminology for synchronization networks", and so need not be described here in more detail. The Supervision Result SSM is also well known and is defined in the above-referenced ETSI document EG 201 783. Frequency Deviation is also a well-known concept, and need not be defined here. An eighth column 315 indicates node functions, of nodes along the trail which might affect the synchronization transmission characteristics. This enables the table to include some synchronization transmission characteristics of parts of the trails using packet-based communications.

FIG. 10, Synchronization Transmission Characteristics for the Packet-Based Part

The main difference between physical layer based communication and packet based communication (for example, timing carried via IEEE1588 (PTP) packets) is that in the former case the synchronization is distributed and regenerated by all network elements that are part of the synchronization network. In the latter case the timing is distributed from a master to a slave, and the intermediate nodes may or may not be required to handle the timing (e.g. via regeneration). Another fundamental difference is that from a slave perspective the stand-by reference can be defined on a master clock basis and not on a link basis as in case of the traditional physical layer synchronization methods.

This means that different information needs to be exchanged between the nodes, for the packet-based parts of the trails, and the trail comparison step needs to be able to take account of this new information. In some embodiments, a single unified management protocol running over the control plane can handle at the same time different types of synchronization networks (e.g. SyncE and IEEE1588), though in principle, the different types of information for the packet-based and synchronous parts could be gathered by different protocols, optionally stored in different places, and both places accessed by the trail comparator to enable the different types to be compared.

The following cases of packet-based communication can be identified:
  Full packet based network running over a connection-oriented packet network;
  Full packet based network running over a connection-less packet network;
  Mixed physical layer/packet based network The packet based method can also be deployed with or without timing support of the network (e.g. timing packets regenerated or modified in all or some of the network nodes along a trail).

The connection-less scenario will not be discussed in detail, because delays are less predictable. Some QoS mechanism over pre-defined paths can be used to make the delays more predictable. The nodes that are part of the packet-based parts of the synchronization network could be of the following types for example (other types may be envisaged):
  Nodes only forwarding the timing packet (and therefore adding some packet jitter);
  Nodes regenerating the time (e.g. IEEE1588 Boundary Clock); this is very similar to a physical layer based clock (e.g. in terms of stand-by references, clock quality etc.),
  Nodes which enhance the packet data (e.g. IEEE1588 Transparent Clock nodes), to enhance the data to indicate delay values detected at the node, and
  Nodes defined by the routing protocol as an alternative path in case of failures in the network (in this case, some interaction with the routing protocol data (e.g. OSPF LSA) could be used in order to get a picture of the available routing paths.

These different types of nodes can affect the timing of the synchronization information being carried by the packets, and so information about these nodes can represent synchronization transmission characteristics of the trails. The trail comparison and selection mechanism in this context can be extended to take into account for example transmission characteristics such as number of nodes in the trail, number of nodes that are not providing timing support, number of Boundary Clock nodes, number of transparent clock nodes and so on.

In case of a mixed physical layer/packet based methods, this information can also be added by each node. The comparison and selection mechanism can also consider other factors such as the reliability of one method vs. the other (in particular a physical layer based method is not impacted by packet delay variation and could be considered as a first priority).

The data exchanged between the nodes and with the management network, can therefore include the above information.

In order to avoid excessively large tables, the synchronization network can optionally be divided up into parts, with each part containing only data for a related subset of the entire synchronization network.

Updating the Database Table Avoiding Timing Loops

The discussion will now focus on how the contents of the table are modified in the event of a failure in the synchronization network. Suppose that a malfunction (e.g., a break in a cable) occurs that renders the synchronization link between nodes F and G for example, inoperative. These node identities correspond to those shown in the rows of the table of FIG. 10. This means that node G will have to obtain synchronization from another source, and in order to avoid timing loops, other nodes may need to be reconfigured as well. This can be coordinated by utilizing a protocol to distribute table updates, so that each node will have complete information upon which to base reconfiguration decisions. The information changes piece-wise, so a number of updated tables are created and distributed in succession.

For example, after detecting the loss of its synchronization source, node G would examine its own table and discover that it cannot immediately select to receive its synchronization reference from a further node identified as node H, since this would cause a timing loop. (The table shows that the node H's source is traceable to node G.) So, node G opts instead to receive its synchronization reference from its own internal clock.

Node G updates the table 300 to reflect this change, and distributes it to the other nodes in the synchronization network. As the table is distributed from node to node, changes are made in a piecemeal fashion to adjust to the previous changes. In particular, if a Supervision Result indicating "ALARM" has been generated in Node G for example as a result of the supervisor detecting something not working, such as Loss of Frame, or MTIE exceeding a certain threshold, then this "ALARM" in turn causes Node G's highest priority link to transition from a "locked" state to a "FAILURE" state. In response to this failure, Node G's third priority synchronization reference source now transitions from a "standby" mode to a "locked" state (meaning that it is being used by node G). This highlights the fact that in the reference selection algorithm, the condition of avoiding timing loops is given greater importance than choosing the reference having the highest priority. A further consequence is that node H will change to show a transition in quality from a G.811 quality reference to a G.813 quality reference.

Figure 11:
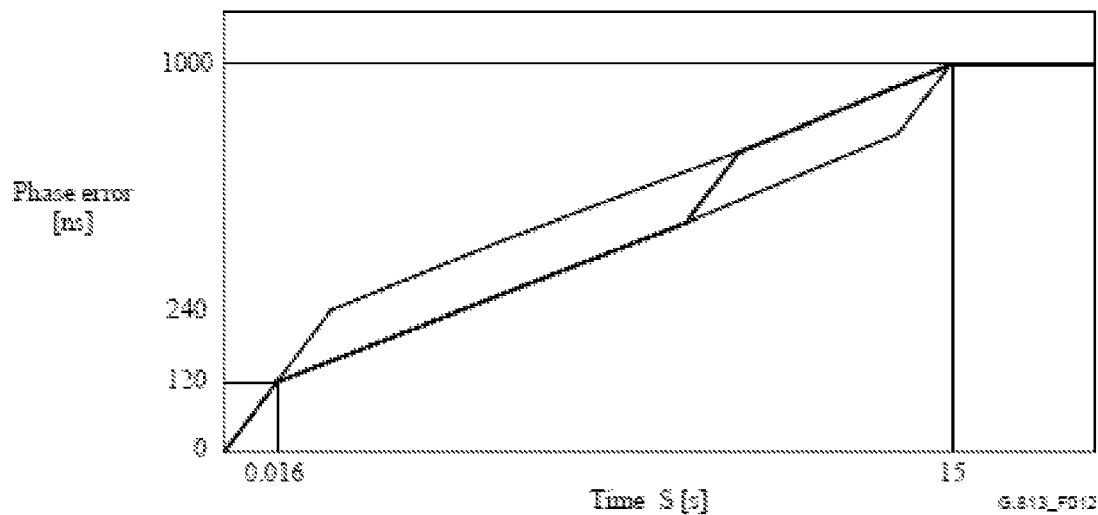
FIG. 11 shows a graph of phase error with time following failure of a trail.

FIG. 11, Graph of Phase Error During Reconfiguration

FIG. 11 shows how the phase error between frequency and timing can build during a holdover, during reconfiguration, in an example of this operation as described by the ITU-T G.813 recommendation. The first slope is related to the clock switching from being locked to the external reference and entering the holdover state (this may lead to a phase jump on the output with a magnitude of at most 120 ns, in this case the clock will enter holdover in at least 0.016 sec given the timing requirements of the SDH and SyncE/SDH systems).

After that initial jump and up to about 15 sec (0.016 are taken by the second jump when the clock locks again to the second reference) the end node enters the hold-over state in with a lower phase error slope that shall not exceed 50 ppb. During this period the end node has all the time to lookup its source selection table and to verify the state of the higher priority best choice in its table (alarms, frequency accuracy and so on).

After the validation of the best secondary source the end-node locks to it and the phase error slope resets to zero.

According to the configuration examples described, the end node will use the time window up to about 15 sec to select the new Source in such a way to guarantee that the PTP flow is generated by the same master as the SyncE/SDH master.

In addition the end nodes having been informed of the failure recovery (which may have or may have not resulted in a change of master for the SyncE trail, but in any case has probably created phase jumps) can take appropriate actions (e.g. not use SyncE/SDH to support time sync operations over an appropriate time interval due to possible excessive phase error carried by the SyncE/SDH trail).

The proposed trail selection algorithm will always select new sources for time or frequency considering which primary reference they are traceable to and the requirement to maintain these references always aligned.

As a consequence the slave node will need to recover primary reference information from the protocols used to propagate the synchronization information through the network.

In the particular case, here used as an example without implying any limitation, the PTP protocol will be adopted for phase information propagation and Synchronous Ethernet will be used for frequency information propagation then the slave node will need to read the primary reference clock of every PTP received flow in the relative field of the PTP packets and the primary reference of every Synchronous Ethernet link in the relative ESMC channel.

Figure 12:
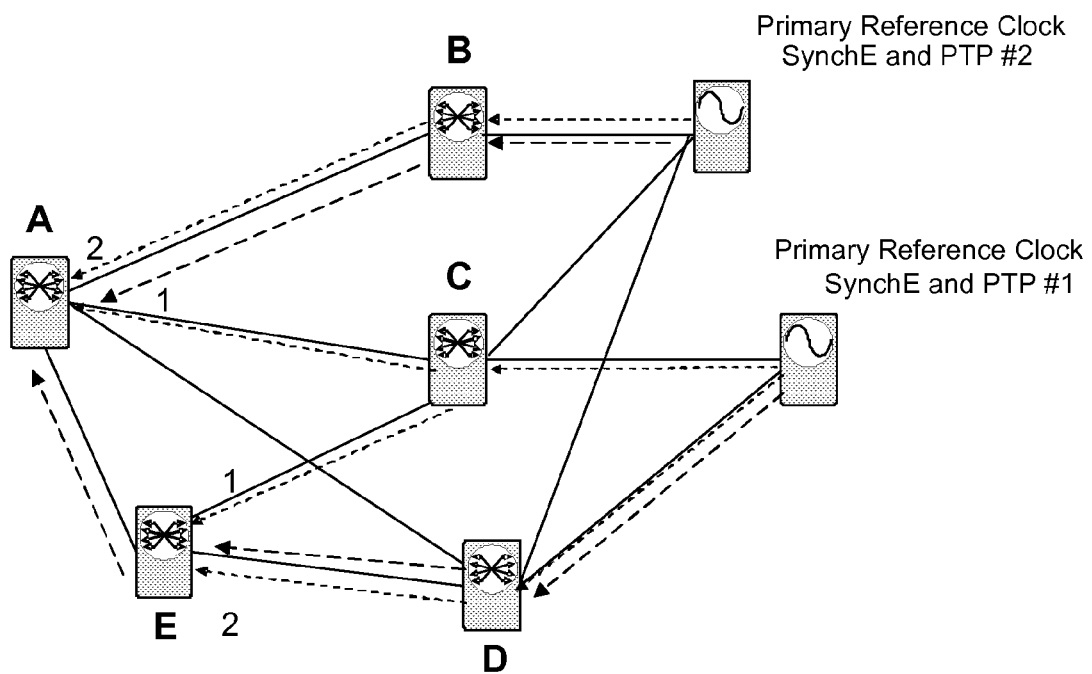
FIGS. 12 to 14 show a schematic views of a network before and after a fault in node C, according to an embodiment.
Figure 13:
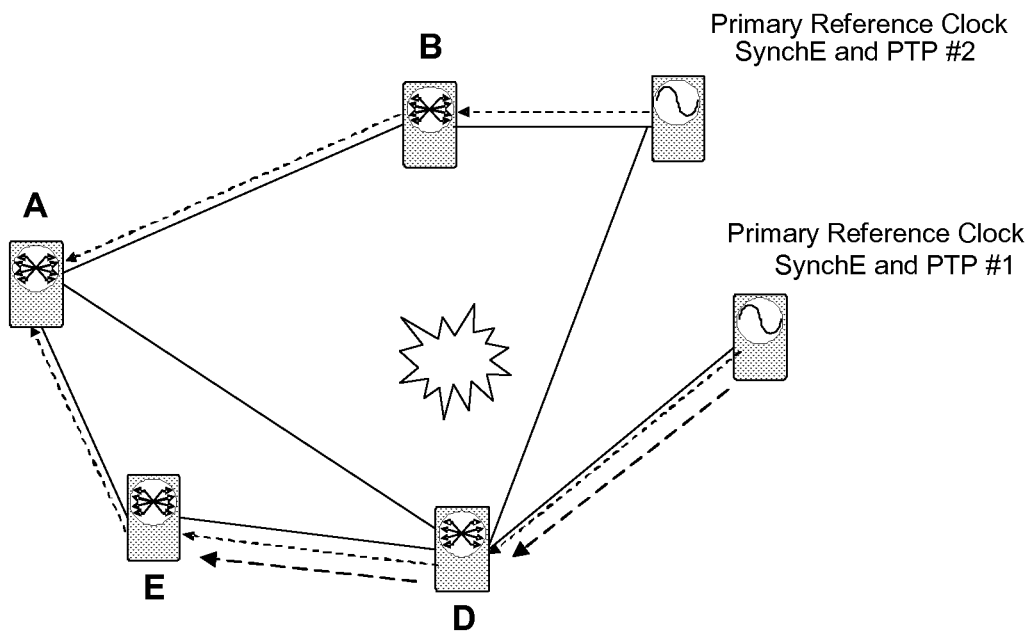
Figure 14:
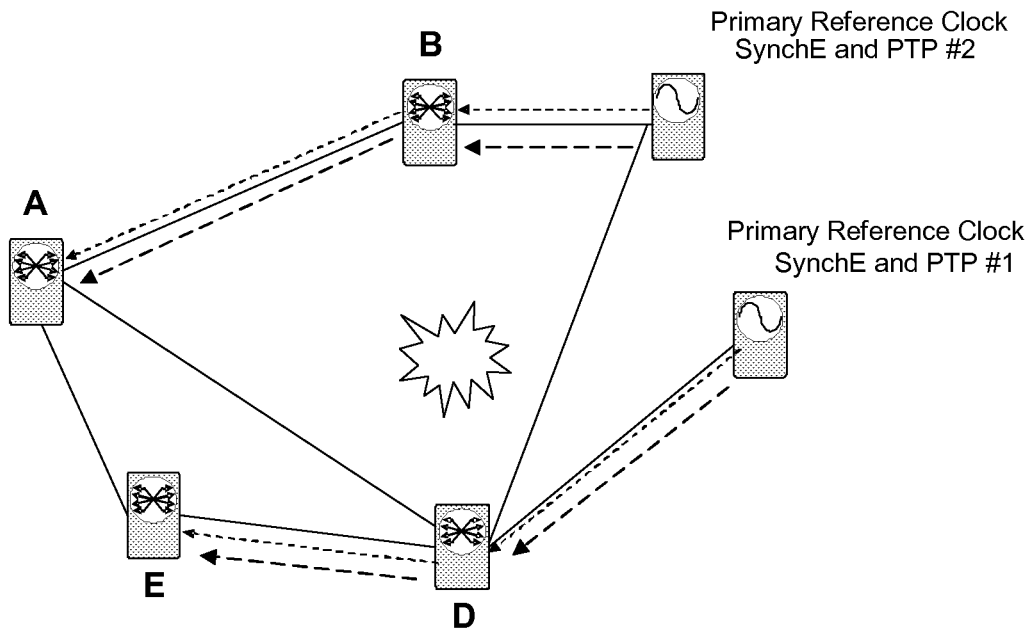

FIGS. 12 to 14, Further Example of Reconfiguration Following a Fault.

In FIG. 12 a hybrid synchronization network is shown, having five nodes, A, B, C, D and E. These node identities are not related to those shown in FIG. 10. A source in the form of a PRC/PTP Grandmaster is responsible of delivering synchronization (both frequency and time) to nodes A, C, D, and E. A second source in the form of a second PRC/PTP Grandmaster is responsible of delivering synchronization (both frequency and time) to node B. This is passed on to node A as a second ranked alterative pair of trails to node A. The dotted line arrows indicate frequency trails and the dashed line arrows indicate time synchronization trails. In particular, node A is supposed to have two entries in its Synchronous Ethernet priority table of frequency trails, a first being the line (marked "1") coming from node C and being of higher priority compared to the line (marked "2") coming from node B. Similarly, node E can take the frequency at the physical layer from either node D (priority 2) or node C (priority 1). Node A also has a PTP best master clock algorithm which currently is selecting the PTP packets from the PTP Grandmaster #1.

FIG. 12 shows the configuration of frequency and time synchronization trails in an initial error-free condition. FIGS. 13 and 14 show possible reconfigurations. In FIG. 13 a fault is supposed to occur at node C, shown by a symbol in place of node C to denote that node C cannot be contacted. Node A and node E, using the procedure explained earlier, will take synchronization from node B and node D respectively, according to their synchronization sources table. In FIG. 13 is shown what may happen if no attempt is made to choose trails having a common source. Looking at node A, it is in a condition where it takes frequency from node B and time from node E, thus likely getting into accuracy issues, as already explained.

In FIG. 14 the same fault is supposed to occur at node C but in this case the procedure for choosing trails having the same source according to an embodiment is applied. Both node A and node E will select their frequency source according to their synchronization sources table, as it happens in FIG. 12 too, but this time node A is aware (by means of the enhanced ESMC) of the PRC masters that generates the timing of all incoming links, in particular that PRC 2 is the frequency sync master of the selected frequency sync reference (link from Node B). In this way Node A can also make it sure that PTP Master 2 is also selected for time sync, so that there is a common source for both time synchronization and frequency trails.

The above example can be generalized in case Boundary Clocks are used. In this case the frequency synchronization reference link (and the related PRC) selected by each Boundary Clock could be based on knowledge of the PTP Grand-Master currently used. The hybrid solution based on physical layer (e.g. Synchronous Ethernet) and Packet-based method (e.g. IEEE1588) can overcome the traditional drawbacks of these solutions deployed alone, taking the best of the two methods and leading to an improvement in the overall synchronization architecture with better performances.

A main advantage of at least some embodiments is that without any significant cost penalty, it can enable a more optimal implementation of a hybrid synchronization solution. This can be achieved by any way of controlling the master selection algorithm for both phase and frequency in order to align them and avoid any master divergence and consequent phase errors.

Notably it can be easily implemented without requiring any particular dedicated hardware. Indeed, existing algorithms (e.g. SDH master selection technique) can be taken advantage of by implementing relatively simple extensions.

Figure 15:
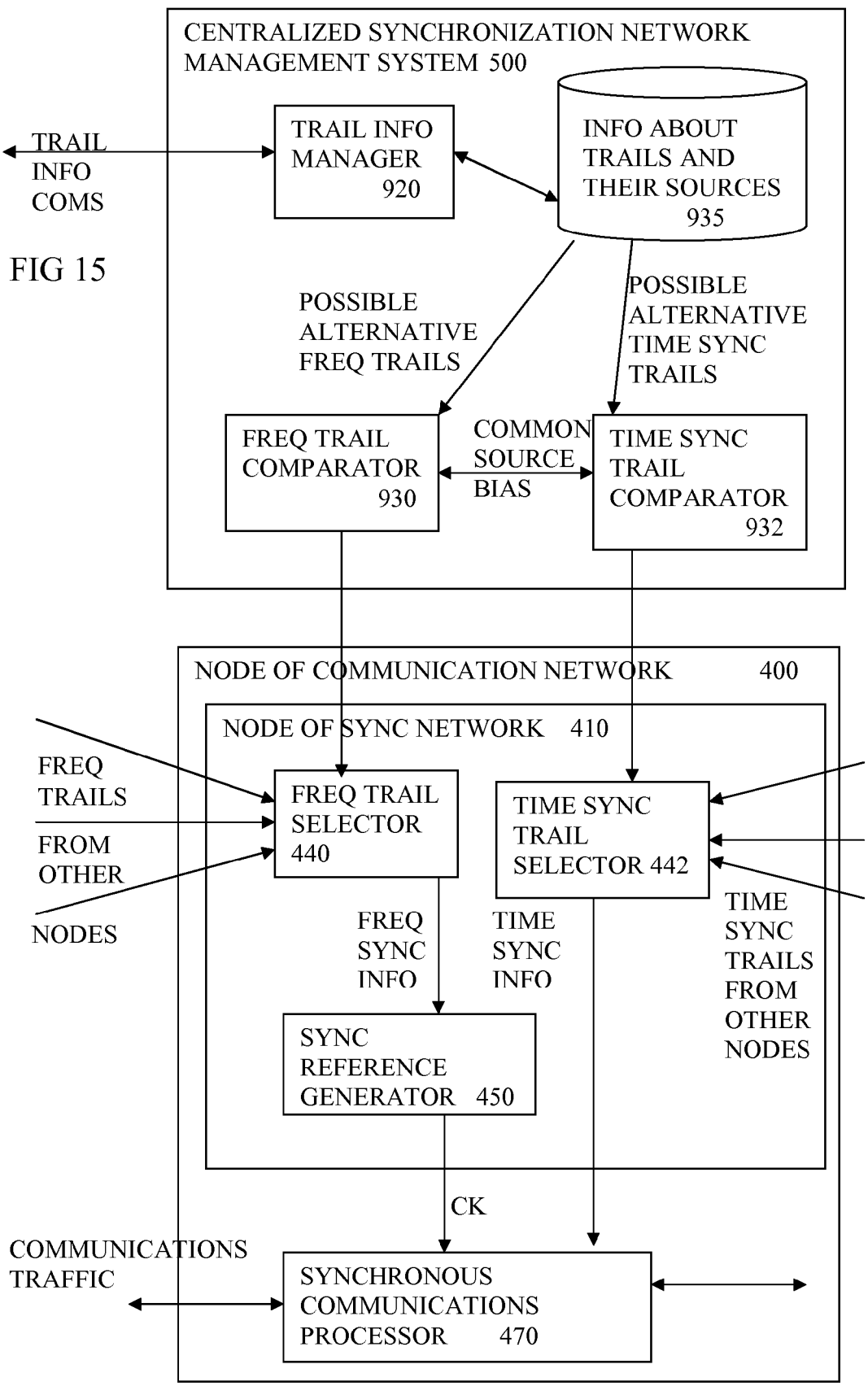
FIG. 15 shows a schematic view of a node of a synchronization network, and a centralized synchronization management system according to an embodiment.

FIG. 15, Centralised Trail Comparison

FIG. 15 shows an example showing similar features to those of FIG. 3, but differing in that the functions relating to configuration, such as trail comparison, are carried out centrally. The figure shows a centralised synchronization network management system 500, having a trail info manager 420, a trail info database 435, a frequency trail comparator 930 and a time synchronization trail comparator 932.

There is a node 410 of a synchronization network, which outputs a synchronization reference or clock, for use by synchronous parts of a communications network. This node of the synchronization network has a frequency trail selector 440 and a time synchronization trail selector 442 for selecting which one of the various synchronization trails leading to this node, is selected for providing the synchronization information. As in FIG. 3, this synchronization information is used by the synchronization reference generator 450 in the usual way, to generate the clock, and to feed the synchronous communications processor as in FIG. 3. The frequency trail selector is controlled by an output of the frequency trail comparator 930 from the centralized synchronization network management system. The time synchronization trail selector is controlled by an output of the time synchronization trail comparator 932 from the centralized synchronization network management system.

The trail comparators use information about the source and about the trail as stored in the database 435. The trail information manager 420 fills and maintains this database, by obtaining information from all the nodes in the synchronization network. An advantage of centralising these functions, compared to having them distributed across all the nodes, is that delays in propagating information across large networks can be reduced. Also, it is easier for operators to intervene in the centralised version. Conceivably the trail info database could be held centrally, and the trail comparator algorithm carried out locally at each node. This would spread the computational resource demands, but increase the communications requirements between the nodes and the centralised database.

Other Features

OSPF can be extended via the definition of a TE Link LSA (Link State Advertisement) capable of carrying also synchronization information. In particular, for the synchronization applications discussed here, the G.OSPF-TE can be adapted to distribute the synchronization network topology information useful to enable trails to be compared and to enable trails having a common source. Note that no signalling protocol extension is required as the information distributed via the extended OSPF is sufficient for the nodes to properly set up the synchronization paths.

Each TE Link in the network is described by the OSPF with a TE Link LSA (as specified in RFC 3630—Traffic Engineering (TE) Extensions to OSPF Version 2) containing a Link TLV (Type Length Value). A TE Link LSA comprises a certain number of sub-objects called sub-TLVs. Each of these sub-objects describes some of the characteristics of the TE Link.

Each TE Link contains one or more Link Components (LC) representing a physical connection between two adjacent nodes. The first parameter associated with a LC is a local identifier that can univocally identify it: the Link Component ID. Other parameters are technology specific and, in this specific context, are related to synchronization.

In addition to OSPF, other existing or new protocols could be considered as long as they provide additional functionalities. For example, the LMP (Link Management Protocol), which runs between a pair of nodes and is aimed at TE Links management, could be used to enhance the synchronization solution.

The new parts to enable common sources can be arranged to coexist with existing synchronization mechanisms. Where any conflict arises, there may be a need to have nodes ignore some parts, such as the "SSM" protocol, which might need to be ignored in order to avoid possible misalignments.

For the case of the physical layer based synchronization networks (e.g. SyncE, SDH), all the protocol packets described above travel a single IP hop. That means that all network elements that participate into the synchronization network (or that terminate it) have to be properly addressed (the protocol shall operate on link basis). In other words the packets shall not be carried transparently over network elements that are part of the synchronization network.

Other variations and embodiments can be envisaged within the claims.

The invention claimed is:

1. A method of configuring a node of a synchronization network, the method comprising the steps of:
    identifying a plurality of possible alternative synchronization trails for passing synchronization information from a synchronization source to the node, the possible alternative synchronization trails comprising a plurality of time synchronization trails arranged to carry time synchronization information for time synchronization at the node, and a plurality of frequency synchronization trails, arranged to carry frequency synchronization information for frequency synchronization at the node,
    determining information about the sources of the possible alternative synchronization trails, and
    comparing automatically the possible alternative synchronization trails, using the information about the sources, to choose:
        a first one of the plurality of time synchronization trails for the node to use for time synchronization; and
        a first one of the plurality of frequency synchronization trails for the node to use for frequency synchronization,
    wherein the comparison of the plurality of possible alternative synchronization trails is biased to increase a likelihood that the first one of the plurality of time synchronization trails and the first one of the plurality of frequency synchronization trails share the same source, over a likelihood that the first one of the plurality of time synchronization trails and the first one of the plurality of frequency synchronization trails have different sources.

2. The method of claim 1, wherein the comparing step comprises choosing the first one of the plurality of frequency synchronization trails first, and subsequently biasing the choosing of the first one of the plurality of time synchronization trails to increase a likelihood of choosing first one of the plurality of time synchronization trails having the same source as that of the selected first one of the plurality of frequency synchronization trails.

3. The method of claim 1, wherein the comparing step is biased by determining a plurality of different pairs of the plurality of time synchronization trails and the plurality of frequency synchronization trails, each pair sharing the same source, and comparing the pairs to choose a pair comprising the first one of the plurality of time synchronization trails and the first one of the plurality of frequency synchronization trails to use.

4. The method of claim 1, at least some of the frequency synchronization trails comprising a physical layer path taken by data transmitted synchronously, from which a clock signal can be extracted to derive the frequency synchronization information.

5. The method of claim 1, at least some of the time synchronization trails being arranged to use packet-based communication.

6. The method of claim 1, the step of determining information about the sources comprises receiving at the node, information transmitted along a particular one of the plurality of possible alternative synchronization trails relating to a source of that corresponding particular one of the plurality of possible alternative synchronization trails.

7. The method of claim 1, the comparing step involving comparing a quality of the sources of the different possible alternative synchronization trails.

8. The method of claim 1, the node having a database for storing information relating to the plurality of possible alternative synchronization trails, and the method having the steps of receiving and storing at the node updated information about the plurality of possible alternative synchronization trails from a neighbouring node, reassessing at the node the choice of the plurality of frequency synchronization trails and the plurality of time synchronization trails based on the updated information, using the newly chosen first one of the plurality of time synchronization trails and the first one of the plurality of frequency synchronization trails for synchronization at the node, and sending out updates to neighbouring nodes to pass on the updates and to indicate the selection of the first one of the plurality of time synchronization trails and the first one of the plurality of frequency synchronization trails.

9. A node for a synchronization network, the node having:
a) a configuration manager arranged to identify a plurality of possible alternative synchronization trails for passing synchronization information from a synchronization source to the node, the possible alternative synchronization trails comprising a plurality of time synchronization trails arranged to carry time synchronization information for time synchronization at the node, and a plurality of frequency synchronization trails, arranged to carry frequency synchronization information for frequency synchronization at the node, the configuration manager also being arranged to determine information about the sources of the possible alternative synchronization trails,
b) a comparator arranged to compare automatically the possible alternative synchronization trails, using the information about the sources, to choose:
a first one of the plurality of time synchronization trails for the node to use for time synchronization; and
a first one of the plurality of frequency synchronization trails for the node to use for frequency synchronization;
wherein the comparison of the plurality of possible alternative synchronization trails is biased to increase a likelihood that the first one of the plurality of time synchronization trails and the first one of the plurality of frequency synchronization trails share the same source, over a likelihood that the first one of the plurality of time synchronization trails and the first one of the plurality of frequency synchronization trails have different sources, and
c) a trail selector controlled by the comparator for switching the time synchronization information and the frequency from the chosen first one of the plurality of time synchronization trails and the first one of the plurality of frequency synchronization trails to provide a synchronization reference for the node.

10. The node of claim 9, wherein the comparator is arranged to choose the first one of the plurality of frequency synchronization trails first, and subsequently biasing the choosing of the first one of the plurality of time synchronization trails to increase a likelihood of choosing first one of the plurality of time synchronization trails having the same source as that of the selected first one of the plurality of frequency synchronization trails.

11. The node of claim 9, wherein the comparator is arranged to determine a plurality of different pairs of the plurality of time synchronization trails and the plurality of frequency synchronization trails, each pair sharing the same source, and comparing the pairs to choose a pair comprising the first one of the plurality of time synchronization trails and the first one of the plurality of frequency synchronization trails to use.

12. The node of claim 9, at least some of the frequency synchronization trails comprising a physical layer path taken by data transmitted synchronously, and at the node, circuitry arranged to extract a clock signal and derive the frequency synchronization information, and at least some of the time synchronization trails being arranged to use packet-based communication.

13. A centralized management system for a synchronization network, the management system being remote from a node and arranged to:
identify a plurality of possible alternative synchronization trails for passing synchronization information from a synchronization source to the node, the possible alternative synchronization trails comprising a plurality of time synchronization trails arranged to carry time synchronization information for time synchronization at the node, and a plurality of frequency synchronization trails, arranged to carry frequency synchronization information for frequency synchronization at the node;
determining information about the sources of the possible alternative synchronization trails, and
comparing automatically the possible alternative synchronization trails, using the information about the sources, to choose:
a first one of the plurality of time synchronization trails for the node to use for time synchronization; and
a first one of the plurality of frequency synchronization trails for the node to use for frequency synchronization,
wherein the comparison of the plurality of possible alternative synchronization trails is biased to increase a likelihood that the first one of the plurality of time synchronization trails and the first one of the plurality of frequency synchronization trails share the same source, over a likelihood that the first one of the plurality of time synchronization trails and the first one of the plurality of frequency synchronization trails have different sources.

14. A synchronization network comprising:
a plurality of nodes;
a synchronization source coupled to the plurality of nodes; and
a plurality of possible alternative synchronization trails for passing synchronization information from the synchronization source to the plurality of nodes, the possible alternative synchronization trails comprising:
a plurality of time synchronization trails arranged to carry time synchronization information for time synchronization at the plurality of nodes; and a plurality of frequency synchronization trails arranged to carry frequency synchronization information for frequency synchronization at the node;

wherein at least one of the plurality of nodes comprises a comparator operable to:

determine information about the sources of the possible alternative synchronization trails;

comparing automatically the possible alternative synchronization trails, using the information about the sources, to choose:

a first one of the plurality of time synchronization trails for the node to use for time synchronization; and a first one of the plurality of frequency synchronization trails for the node to use for frequency synchronization;

wherein the comparison of the plurality of possible alternative synchronization trails is biased to increase a likelihood that the first one of the plurality of time synchronization trails and the first one of the plurality of frequency synchronization trails share the same source, over a likelihood that the first one of the plurality of time synchronization trails and the first one of the plurality of frequency synchronization trails have different sources.

15. A computer program stored on a non-transitory computer readable medium and comprising instructions executable by a processor to cause the processor to:

identify a plurality of possible alternative synchronization trails for passing synchronization information from a synchronization source to the node, the possible alternative synchronization trails comprising a plurality of time synchronization trails arranged to carry time synchronization information for time synchronization at the node, and a plurality of frequency synchronization trails, arranged to carry frequency synchronization information for frequency synchronization at the node;

determining information about the sources of the possible alternative synchronization trails, and comparing automatically the possible alternative synchronization trails, using the information about the sources, to choose:

a first one of the plurality of time synchronization trails for the node to use for time synchronization; and a first one of the plurality of frequency synchronization trails for the node to use for frequency synchronization, wherein the comparison of the plurality of possible alternative synchronization trails is biased to increase a likelihood that the first one of the plurality of time synchronization trails and the first one of the plurality of frequency synchronization trails share the same source, over a likelihood that the first one of the plurality of time synchronization trails and the first one of the plurality of frequency synchronization trails have different sources.

16. The computer program of claim 15, wherein the comparing step comprises choosing the first one of the plurality of frequency synchronization trails first, and subsequently biasing the choosing of the first one of the plurality of time synchronization trails to increase a likelihood of choosing first one of the plurality of time synchronization trails having the same source as that of the selected first one of the plurality of frequency synchronization trails.

17. The computer program of claim 15, wherein the comparing step is biased by determining a plurality of different pairs of the plurality of time synchronization trails and the plurality of frequency synchronization trails, each pair sharing the same source, and comparing the pairs to choose a pair comprising the first one of the plurality of time synchronization trails and the first one of the plurality of frequency synchronization trails to use.

18. The computer program of claim 15, wherein determining information about the sources comprises receiving at the node, information transmitted along a particular one of the plurality of possible alternative synchronization trails relating to a source of that corresponding particular one of the plurality of possible alternative synchronization trails.

19. The computer program of claim 15, wherein comparing comprises comparing a quality of the sources of the different possible alternative synchronization trails.

20. The computer program of claim 15, further configure to cause the processor to store information relating to the plurality of possible alternative synchronization trails, and the method having the steps of receiving and storing at the node updated information about the plurality of possible alternative synchronization trails from a neighbouring node, reassessing at the node the choice of the plurality of frequency synchronization trails and the plurality of time synchronization trails based on the updated information, using the newly chosen first one of the plurality of time synchronization trails and the first one of the plurality of frequency synchronization trails for synchronization at the node, and sending out updates to neighbouring nodes to pass on the updates and to indicate the selection of the first one of the plurality of time synchronization trails and the first one of the plurality of frequency synchronization trails.

* * * * *